(12) United States Patent
Lim

(10) Patent No.: US 12,143,149 B2
(45) Date of Patent: *Nov. 12, 2024

(54) UWB SYSTEM

(71) Applicant: HYUNDAI MOBIS CO., LTD., Seoul (KR)

(72) Inventor: Jong Chul Lim, Anyang-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 14 days.

This patent is subject to a terminal disclaimer.

(21) Appl. No.: 18/147,495

(22) Filed: Dec. 28, 2022

(65) Prior Publication Data

US 2023/0137042 A1    May 4, 2023

Related U.S. Application Data

(63) Continuation of application No. 17/137,248, filed on Dec. 29, 2020, now Pat. No. 11,575,408.

(30) Foreign Application Priority Data

Oct. 19, 2020 (KR) .................... 10-2020-0135358
Nov. 25, 2020 (KR) .................... 10-2020-0160545

(51) Int. Cl.
*H04B 1/719* (2011.01)
*H04B 1/713* (2011.01)
(Continued)

(52) U.S. Cl.
CPC ............. *H04B 1/719* (2013.01); *H04B 1/713* (2013.01); *H04B 1/7183* (2013.01);
(Continued)

(58) Field of Classification Search
CPC . H04W 12/03; H04W 12/009; H04W 12/041; H04B 1/719; H04B 1/713;
(Continued)

(56) References Cited

U.S. PATENT DOCUMENTS 7,551,591 B2   6/2009  Erlich et al.
11,503,591 B2  11/2022 de Perthuis
(Continued)

FOREIGN PATENT DOCUMENTS

KR  10-2004-0078728  9/2004
KR  10-2005-0035655  4/2005
(Continued)

OTHER PUBLICATIONS

Office Action dated Mar. 14, 2024 issued in U.S. Appl. No. 18/147,491, filed Dec. 28, 2022.
(Continued)

*Primary Examiner* — Dac V Ha
(74) *Attorney, Agent, or Firm* — DLA Piper LLP US

(57) ABSTRACT

The present invention is proposed to solve the above problems and is directed to providing a UWB system comprising: a memory in which a UWB ranging factor definition program is embedded; and a processor which executes the program, wherein the processor predefines UWB ranging factors to define an encryption key in consideration of a unique m-byte key characteristic for each set of a vehicle and a device.

9 Claims, 27 Drawing Sheets

(51) Int. Cl.
*H04B 1/7183* (2011.01)
*H04L 9/08* (2006.01)
*H04W 12/041* (2021.01)
*H04B 1/69* (2011.01)

(52) U.S. Cl.
CPC ......... *H04L 9/0869* (2013.01); *H04W 12/041* (2021.01); *H04B 2001/6908* (2013.01)

(58) Field of Classification Search
CPC .................. H04B 1/715; H04B 1/7183; H04B 2001/6908; H04B 2001/7154; H04B 2201/71634; H04L 9/0866; H04L 9/0869; H04L 63/0457; H04L 2209/805; H04L 2209/84; H04L 2463/121
See application file for complete search history.

(56) References Cited

U.S. PATENT DOCUMENTS

| | | | |
|---|---|---|---|
| 11,942,984 | B2 | 3/2024 | Tertinek |
| 11,965,951 | B2 | 4/2024 | Yoon |
| 2010/0211780 | A1 | 8/2010 | Mukkara |
| 2014/0052999 | A1* | 2/2014 | Aissi ..................... G06F 21/64 713/189 |
| 2018/0329433 | A1 | 11/2018 | Zhao |
| 2019/0013937 | A1 | 1/2019 | Leong et al. |
| 2019/0129025 | A1 | 5/2019 | Kaufmann |
| 2019/0318074 | A1 | 10/2019 | Ledwith |
| 2020/0014526 | A1 | 1/2020 | Hammerschmidt et al. |
| 2020/0100283 | A1 | 3/2020 | Naguib et al. |
| 2020/0228331 | A1 | 7/2020 | de Perthuis |
| 2020/0336303 | A1 | 10/2020 | Sierra |
| 2020/0336900 | A1 | 10/2020 | Mueck |
| 2021/0014677 | A1 | 1/2021 | Han |
| 2022/0078609 | A1* | 3/2022 | Appietto ............... H04W 12/03 |
| 2022/0261791 | A1 | 8/2022 | Saraniecki |
| 2023/0327720 | A1 | 10/2023 | Casamassima |
| 2023/0396998 | A1 | 12/2023 | Sullivan |

FOREIGN PATENT DOCUMENTS

| | | |
|---|---|---|
| KR | 10-0717847 | 5/2007 |
| KR | 2009-0098890 | 9/2009 |
| KR | 10-1417022 | 7/2014 |
| KR | 10-2020-0028827 | 3/2020 |
| WO | WO 1998/52377 | 11/1998 |

OTHER PUBLICATIONS

Office Action dated Mar. 7, 2024 issued in U.S. Appl. No. 18/147,490, filed Dec. 28, 2022.

Office Action dated May 6, 2024 issued in U.S. Appl. No. 18/147,498, filed Dec. 28, 2022.

Notice of Allowance dated Jul. 19, 2024 issued in U.S. Appl. No. 18/147,490, filed Dec. 28, 2022.

Office Action dated Sep. 6, 2024 issued in U.S. Appl. No. 18/147,491, filed Dec. 28, 2022.

Notice of Allowance dated Sep. 3, 2024 issued in U.S. Appl. No. 18/147,498, filed Dec. 28, 2022.

* cited by examiner

FIG. 2

| | Support | UWB Configuration | | | | | | | | | | | | | | | | | | | | | | | | | |
|---|---|---|---|---|---|---|---|---|---|---|---|---|---|---|---|---|---|---|---|---|---|---|---|---|---|---|---|
| | | | General | | | SYNC | | | SFD | | PHR | | | STS | | | | | | Modulation&Coding | | | Data Symbol Structure | | | | | Data | |
| | | | Channel No. | Peak PRF (MHz) | Mean PRF (MHz) | SYNC field length (symbols) | Preamble codes | Preamble code length | SFD length | SFD # | HRP-SRDEV PHR Mode | PHR data rate (Mbps) | HRP-SRDEV Mode | Data Length 6L | Pulse spacing (chips) | PRF (MHz) | Length of Active segment in units of 512 chips(~1us) | Number of Segments | ViterbiRate | RS Rate | Overall FEC rate | # Burst Positions per Symbol Nburst | # Hop Bursts Nhop | # Chips per burst Ncpb | # Chips per Symbol | Burst Duration Tburst (ns) | Symbol Duration Tdsym(ns) | Symbol Rate (MHz) | Bit rate(Mb/s) |
| Optional | 0 | 5.9 | 499.2 | 62.4 | 64 | 9,10,11,12 | 127 | 8 | 0 | BPRF | 0.85 | BPRF | 8 | 8 | 62.4 | 64 | 1 | 0.5 | 0.87 | 0.44 | 8 | 2 | 8 | 64 | 16.03 | 128.2 | 7.8 | 6.81 |
| Mandatory | 1 | 5.9 | 499.2 | 62.4 | 64 | 9,10,11,12 | 127 | 8 | 2 | BPRF | 0.85 | BPRF | 8 | 8 | 62.4 | 64 | 1 | 0.5 | 0.87 | 0.44 | 8 | 2 | 8 | 64 | 16.03 | 128.2 | 7.8 | 6.81 |

FIG. 6
| Frequency [GHz] | Efficiency [%] | Average Gain [dBi] | Peak gain [dBi] |
|---|---|---|---|
| 6.5 | 84.91 | -0.71 | 3.48 |
| 8.0 | 83.76 | -0.76 | 3.48 |
<UWB Ant.>
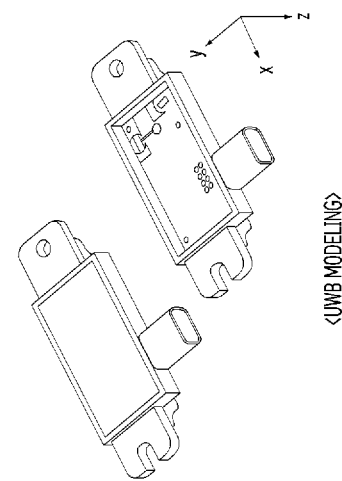
<UWB MODELING>
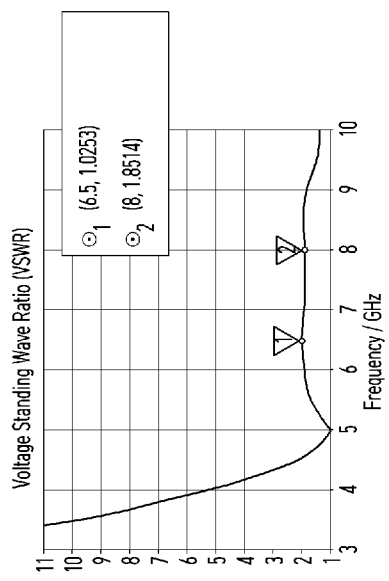
<VSWR>
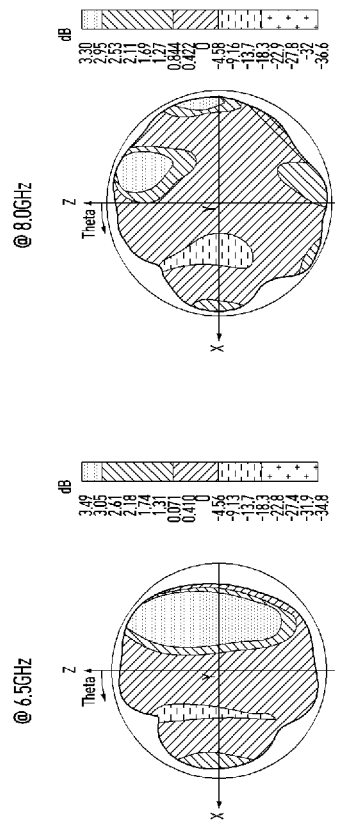
<3D Pattern>

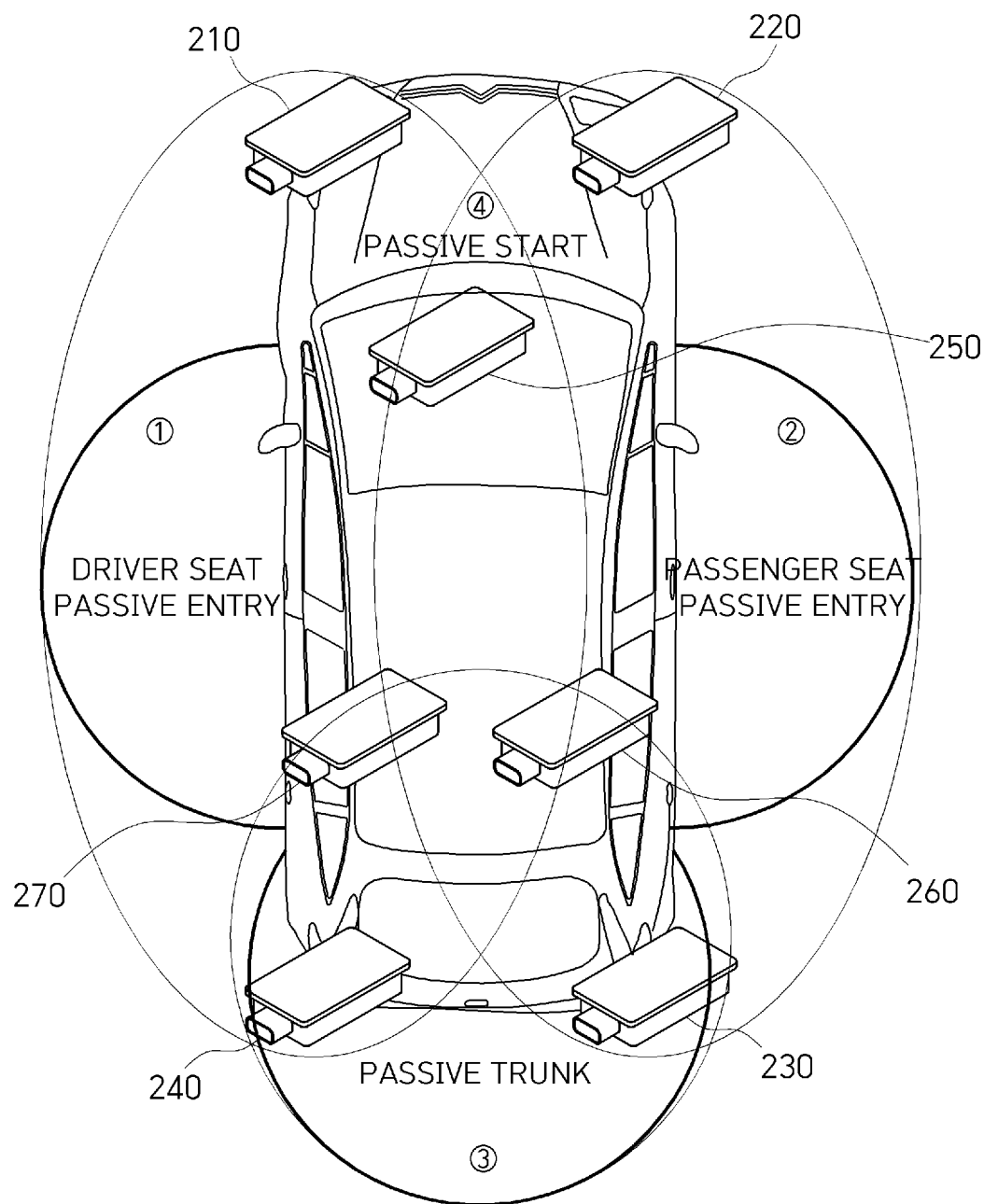

PASSIVE TRUNK

UWB SYSTEM

CROSS-REFERENCE TO RELATED APPLICATION

This application is a continuation application of U.S. application Ser. No. 17/137,248 filed Dec. 29, 2020, which claims priority to and the benefit of Korean Patent Application No. 10-2020-0135358, filed Oct. 19, 2020, and Korean Patent Application No. 10-2020-0160545, filed Nov. 25, 2020. The entirety of the above-listed applications are incorporated herein by reference.

BACKGROUND

Field of the Invention

The present invention relates to an ultra-wideband (UWB) system.

Discussion of Related Art

Ultra-wideband (UWB) technology is a technology that calculates a distance between entities by multiplying a signal arrival time between communication entities by the speed of light using a time-of-flight (ToF) technique of ultra-wideband (6 to 8 GHz with a bandwidth of over 500 MHz).

According to the related art, digital-key (smartphone) UWB ranging follows an operation sequence defined in the international standard such as the Car Connectivity Consortium (CCC).

According to the related art, the corresponding standard association suggests that various ranging factors (e.g., a scrambled timestamp sequence (STS) indexes, an encryption key, etc.) that need to be selected for UWB communication should be exchanged with smartphones using other communication means (near-field communication (NFC), BLE, etc.) through pre-handshaking. However, the smart key system according to the related art has restrictions on the use of such communication means (NFC, BLE, etc,) and the pre-exchange of keys.

SUMMARY OF THE INVENTION

According to an aspect of the present invention, there is provided an ultra-wideband (UWB) system comprising: a memory in which a UWB ranging factor definition program is embedded; and a processor which executes the program, wherein the processor predefines UWB ranging factors to define an encryption key in consideration of a unique m-byte key characteristic for each set of a vehicle and a device.

The processor defines STS encryption key, Data encryption key, and STS Index encryption key as the encryption keys.

The processor further defines a scrambled timestamp sequence (STS) index and a nonce.

The processor defines Salt, Source Address, and Random Counter as the nonces.

The processor defines the STS index, the encryption key, and the nonce in consideration of characteristic information by using encryption key values created according to the same rule on the basis of a random value provided by a device or a seed value provided by a vehicle.

The processor determines the STS index in consideration of a characteristic of an n-byte random value that is changed every ranging.

The n-byte random value is delivered through a pre-poll every ranging, and STS of a poll, a response, and a final message are created using the determined STS index.

The processor determines the nonce in consideration of a unique key characteristic of an individual device.

The numbers assigned according to a training order of the individual devices are used as the nonces.

BRIEF DESCRIPTION OF THE DRAWINGS

FIG. 2 shows an ultra-wideband (UWB) module application band according to an embodiment of the present invention.

FIG. 6 illustrates UWB modeling, UWB antenna specifications, a voltage standing wave ratio (VSWR), and 3D antenna patterns according to an embodiment of the present invention.

FIG. 17 shows a UWB module driven for each operation scenario according to still another embodiment of the present invention.

DETAILED DESCRIPTION OF EXEMPLARY EMBODIMENTS

Figure 1:
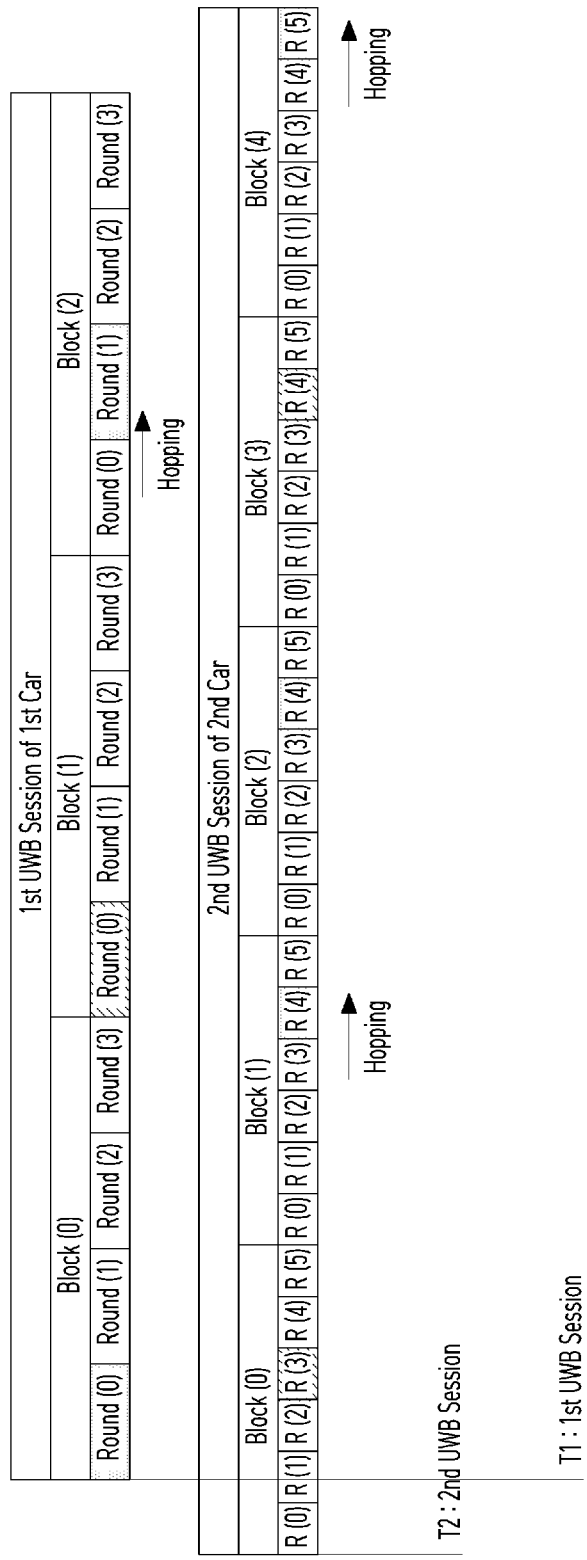
FIG. 1 illustrates a problem of time-slotted channel hopping (TSCH) in the related art.

These and other objects, advantages and features of the present invention, and implementation methods thereof will be clarified through the following embodiments described with reference to the accompanying drawings.

The present invention may, however, be embodied in different forms and should not be construed as being limited to the embodiments set forth herein. Rather, these embodiments are provided so that this disclosure will fully convey the objects, configurations, and effects of the present invention to those skilled in the art. The scope of the present invention is defined solely by the appended claims.

The terminology used herein is for the purpose of describing particular embodiments only and is not intended to be limiting to the invention. As used herein, the singular forms "a," "an," and "one" include the plural unless the context clearly indicates otherwise. The terms "comprise" and/or "comprising," when used in this specification, specify the presence of stated elements, steps, operations, and/or components, but do not preclude the presence or addition of one or more other elements, steps, operations, and/or components.

The background of the present invention will be described first before embodiments of the present invention are described.

UWB is a technology that calculates a distance between entities by multiplying a signal arrival time between communication entities by the speed of light using a time-of-flight (ToF) technique of ultra-wideband (6 to 8 GHz with a bandwidth of over 500 MHz).

In the related art, time-slotted channel hopping (TSCH) is channel hopping that is continuously repeated over time. In some cases, the channel hopping causes continuous communication interference depending on the operation period.

In the related art, a smart key (SMK) system uses low frequency (LF; 125 kHz) and radio frequency (RF; 434 MHz) techniques to determine the position of a smart key fob, control locking and unlocking of a vehicle door, and start a vehicle.

UWB is a technology that calculates a distance between entities by multiplying a signal arrival time between communication entities by the speed of light using a time-of-flight (ToF) technique.

According to the related art, even when a UWB antenna radiation pattern is designed as uniformly as possible, null points may be generated in the radiation pattern due to unpredictable factors such as vehicle environments and surrounding environments.

In order to solve this problem, diversity may be implemented by designing a plurality of antennas. However, this method is inefficient in that ranging needs to be performed twice.

Also, according to the related art, there are problems in terms of power consumption and speed because several anchors continuously perform ranging on a distant tag.

Precise positioning is required when a tag is at a short distance (e.g., less than two meters around a vehicle) but is not required when a tag is far away.

In order to provide location-based services (LBS), technologies such as a Global Positioning System (GPS), Wi-Fi, and Bluetooth have been used. There is a problem in that precise measurement is difficult, but UWB (6 to 8 GHz with a bandwidth of over 500 MHz) has a wide frequency band, low power consumption, and high-accuracy positioning within tens of centimeters.

In the related art, GPS-based and mobile communication network-based positioning technologies have an error range of 5 to 50 meters and an error range of 50 to 200 meters, respectively. In the case of GPS, a failure may occur while signals from satellites reach an urban building area.

In the case of Wi-Fi, positioning is possible at low cost, but since the frequency band used is narrow, there may be a limit to channel division when the number of tracking targets increases. Also, mobile terminals may be disconnected from a stationary Wi-Fi access point (AP).

In the case of Bluetooth, it is possible to deploy a large number of sensors at low cost, but since communication latency is high, this technology is not suitable for real-time positioning in a dynamic environment.

Unlike Wi-Fi and Bluetooth, in the case of UWB, a wide frequency band is used, and it is possible to transmit a large amount of information at a high transmission rate and with low power.

Advantageously, UWB technology-based positioning exhibits a low error rate of about 20 cm, has high transmittance to an obstacle, and is not affected by other signals such as a Wi-Fi signal.

FIG. 1 illustrates a problem of time-slotted channel hopping (TSCH) in the related art.

Referring to a first UWB session of a first vehicle and a second UWB session of a second vehicle, the first vehicle and the second vehicle continue time-hopping, but frequency interference occurs continuously in some cases (according to the period).

FIG. 2 shows a UWB module application band.

The UWB module application band is used for smart key hacking (RSA) defense and digital key (smartphone) positioning.

Channel 5 has a center frequency of 6.5 GHz and a bandwidth of 499.2 MHz, and Channel 9 has a center frequency of 8.0 GHz and a bandwidth of 499.2 MHz.

In addition to the two cases, that is, smart key hacking defense and digital key positioning, various UWB technologies may be applied to vehicles.

For example, a UWB technology for detecting a passenger in a vehicle, a UWB technology for detecting a parking area and notifying a user of danger, and a UWB technology for providing convenience functions (automatic trunk opening, etc.) according to the detection of a user's motion (a kick sensor, etc.) may be applied, and the risk of frequency interference increases as the type of USB communication applicable to vehicles becomes diversified.

Figure 3:
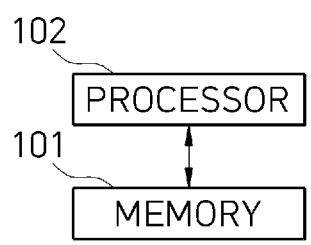
FIG. 3 shows a UWB system according to an embodiment of the present invention.

FIG. 3 shows a UWB system according to an embodiment of the present invention.

The UWB system according to an embodiment of the present invention includes a memory 101 in which a UWB communication program is embedded and a processor 102 which executes the program. The processor 102 performs UWB time-hopping and frequency-hopping to establish a communication channel.

The processor 102 performs UWB operation and activates a hopping timer.

The processor 102 performs time-hopping to avoid signal interference and calculates a hopping count.

The processor 102 determines whether the count value exceeds a first preset value and whether the timer has a value less than a second preset value.

When the count value does not exceed the first preset value or when the timer has a value not less than the second preset value, the processor 102 continues to perform the time-hopping.

When the count value exceeds the first preset value and the timer has a value less than the second preset value, the processor 102 performs frequency-hopping.

After the frequency-hopping, the processor 102 starts the UWB operation and starts the hopping timer.

The processor 102 performs time-hopping to avoid signal interference and calculates a hopping count.

The processor 102 determines whether the count value exceeds a third preset value and whether the timer has a value less than a fourth preset value.

In this case, the first preset value and the third preset value may be set to the same value or different values. Likewise, the second preset value and the fourth preset value may be set to the same value or different values.

The first preset value and the third preset value may be set to be different depending on the communication conditions (the number of nearby communication devices) or the number of times of hopping.

For example, the processor 102 may perform frequency-hopping for the first time after time-hopping is performed once, perform frequency-hopping for the second time after time-hopping is performed two times, and perform frequency-hopping for the third time after time-hopping is performed three times.

When the count value does not exceed the third preset value or when the timer has a value not less than the fourth preset value, the processor 102 continues to perform the time-hopping.

When the count value exceeds the third preset value and the timer has a value less than the fourth preset value, the processor 102 performs frequency-hopping.

Figure 4:
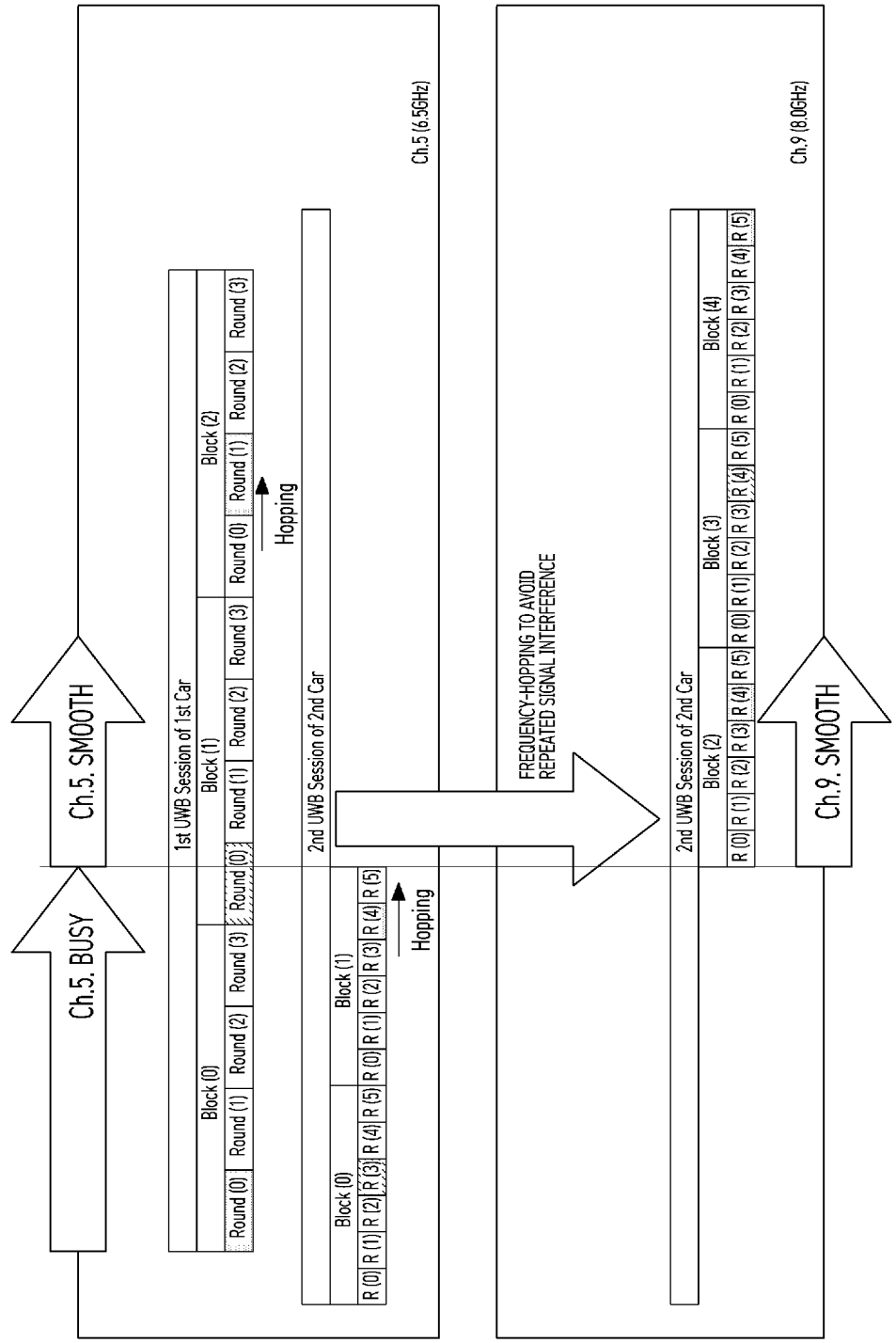
FIG. 4 shows frequency-hopping according to an embodiment of the present invention.

FIG. 4 shows frequency-hopping according to an embodiment of the present invention.

In channel 5, the first UWB session of the first vehicle and the second UWB session of the second vehicle still have interference despite time-hopping. Accordingly, channel 5 is busy.

In order to avoid such repeated signal interference, frequency-hopping is performed on the second UWB session of the second vehicle. As a result, smooth communication is possible in both channels 5 and 9.

Figure 5:
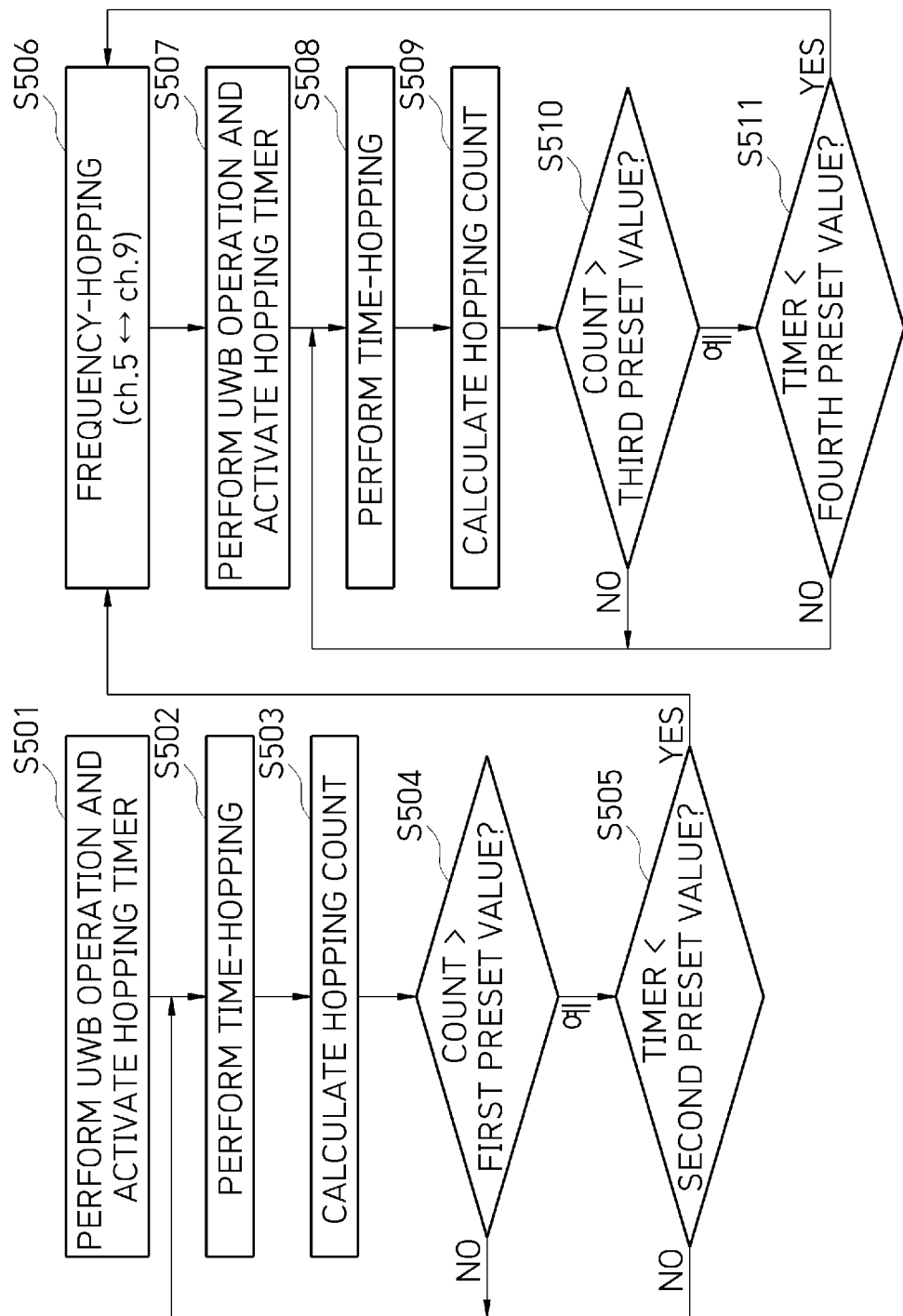
FIG. 5 illustrates a UWB operation method according to an embodiment of the present invention.

FIG. 5 illustrates a UWB operation method according to an embodiment of the present invention.

The UWB operation method according to an embodiment of the present invention includes performing UWB operation and operating a hopping timer, performing time-hopping and monitoring interference situation information, and performing frequency-hopping according to a result of monitoring the interference situation information.

Referring to FIG. 5, the method includes performing UWB operation and activating a hopping timer (S501).

The method includes performing time-hopping to avoid signal interference (S502) and calculating hopping count (S503).

The method includes determining whether the count value exceeds a first preset value (S504) and determining whether the timer has a value less than a second preset value (S505).

The method includes continuing the time-hopping in S502 when the count value does not exceed the first preset value in S504 or when the timer has a value not less than the second preset value in S505.

The method includes performing frequency-hopping (S506) when the count value exceeds the first preset value in S504 and the timer has a value less than the second preset value in S505.

The method includes starting the UWB operation and starting the hopping timer (S507) after the frequency-hopping.

The method includes performing time-hopping to avoid signal interference (S508) and calculating a hopping count (S509).

The method includes determining whether the count value exceeds a third preset value (S510) and determining whether the timer has a value less than a fourth preset value (S511).

In this case, the first preset value and the third preset value may be set to the same value or different values. Likewise, the second preset value and the fourth preset value may be set to the same value or different values.

The first preset value and the third preset value may be set to be different depending on the communication conditions (the number of nearby communication devices) or the number of times of hopping.

For example, frequency-hopping is performed for the first time after time-hopping is performed once, is performed for the second time after time-hopping is performed two times, and is performed for the third time after time-hopping is performed three times.

The method includes continuing the time-hopping (S508) when the count value does not exceed the third preset value in S510 or when the timer has a value not less than the fourth preset value in S511.

The method includes performing frequency-hopping (S506) when the count value exceeds the third preset value in S510 and the timer has a value less than the fourth preset value in S511.

FIG. 6 illustrates UWB modeling, UWB antenna specifications, a voltage standing wave ratio (VSWR), and 3D antenna patterns according to an embodiment of the present invention.

A UWB antenna has an efficiency of 84.91%, an average gain of −0.71 dBi, and a peak gain of 3.48 dBi at 6.5 GHz and an efficiency of 83.76%, an average gain of −0.76 dBi, and a peak gain of 3.38 dBi at 8.0 GHz.

Referring to FIG. 6, VSWR and 3D antenna patterns are shown.

Figure 7A:
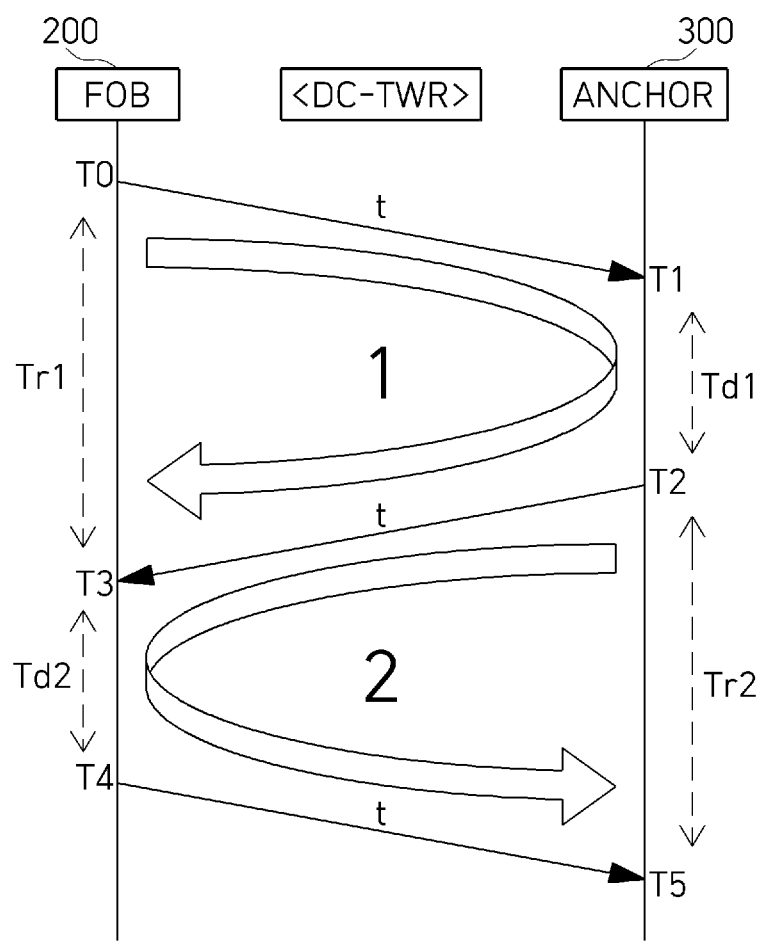
FIG. 7A and FIG. 7B show ranging according to the related art.
Figure 7B:
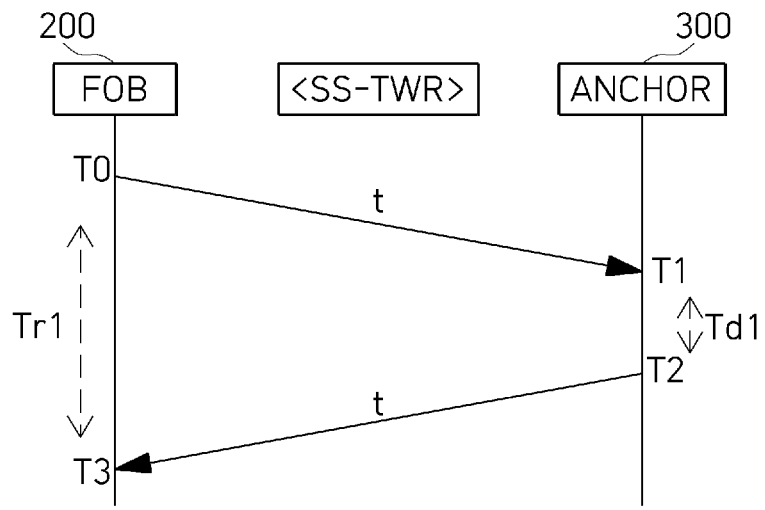

FIG. 7A and FIG. 7B show, as a two-way ranging (TWR) scheme, double-sided (DS) TWR and single-sided (SS) TWR.

Ranging refers to an action of measuring a distance between one fob and one anchor. A data structure conforms to the IEEE802.15.4z standard and takes about 200 us per packet transmission.

A slot is defined as the time it takes for the fob or anchor to transmit (or receive) a signal again after transmitting (or receiving) a signal.

A UWB transmission/reception slot of an RSA defense SMK system may be designed as about 2 ms and may be changed depending on the specification.

The DS-TWR scheme consumes a great deal of power due to the large number of signals that are transmitted and received but has excellent distance measurement accuracy.

A fob transmits a poll packet and records a timestamp T0.

An anchor receives a poll packet and records T1.

The anchor requires time Td1 to receive a signal and generate a response packet, transmits a response message, and records T2.

The fob receives the response message and records T3.

The fob requires time Td2 to receive a signal and generate a final message.

The fob transmits the final message and records T4, and the anchor receives the final message and records T5.

As described above, DS-TWR has an accurate ranging result, but this scheme calculates a distance using two round-trip times, so the calculation formula is complex and power consumption is relatively large.

SS TWR calculates a distance using one round-trip time, so the calculation formula is relatively simple and power consumption is relatively low while the ranging error is large compared to DS-TWR.

However, an error at a distance is acceptable within a certain range, and it is necessary to apply a technology to reduce power consumption during long ranging.

Figure 8:
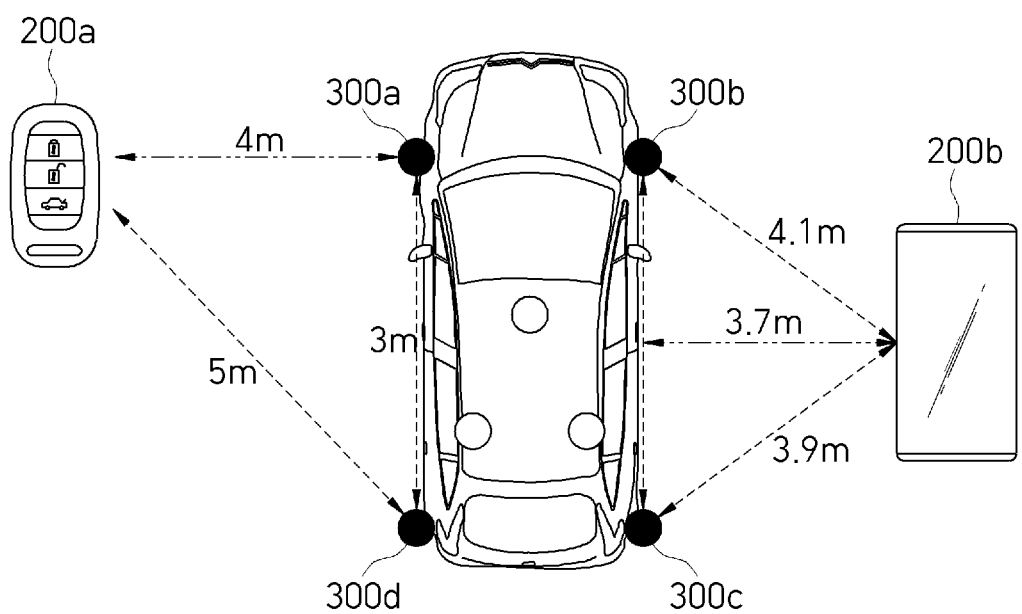
FIG. 8 shows a vertical distance between a tag and an anchor according to another embodiment of the present invention.

FIG. 8 shows a vertical distance between a tag and an anchor according to another embodiment of the present invention.

The distance between a first anchor 300a and a fourth anchor 300d and the distance between a second anchor 300b and a third anchor 300c are 3 meters, and these are preset during the developing stage.

A distance between a vehicle and a tag (a first tag 200a is a fob and a second tag 200b is a smartphone) is generally defined as a vertical distance (the length of a perpendicular line).

The first tag 200a is 4 meters away from the first anchor 300a, is 5 meters away from the fourth anchor 300d, and has a vertical distance of 4 meters.

That is, the vertical distance is equal to 4 meters, which is the distance from the first tag 200a to the first anchor 300a, which is the nearest anchor.

The second tag 200b is 4.1 meters away from the second anchor 300b, is 3.9 meters away from the third anchor 300c, and has a vertical distance of 3.7 meters.

That is, the vertical distance has a difference of 0.2 meters compared to 3.9 meters, which is the distance from the second tag 200b and the third anchor 300c, which is the nearest anchor, and the distance is not large.

When a tag is located at a short distance, such as within 2 meters, from the vehicle, precise positioning is necessary, but when there is a tag at a long distance, precise positioning is unnecessary.

However, when several anchors continuously perform ranging on a remote tag, there are problems in terms of power consumption and operation time.

A UWB system according to another embodiment of the present invention includes an input unit configured to receive information on a separation distance between a tag and a vehicle, a memory in which a ranging program corresponding to the separation distance is embedded, and a processor which executes the program, wherein the program determines a ranging scheme and an anchor to perform ranging according to the separation distance.

The input unit receives information regarding a vertical distance between the tag and the vehicle.

When the separation distance is greater than or equal to a first set distance, the processor performs SS-TWR using an anchor of the vehicle closest to the tag.

When the separation distance is greater than or equal to a second set distance and is less than the first set distance, the processor performs DS-TWR using an anchor of the vehicle closest to the tag.

When the separation distance is greater than or equal to a third set distance and is less than the second set distance, the processor performs SS-TWR using a plurality of anchors.

When the separation distance is less than the third set distance, the processor performs DS-TWR using a plurality of anchors.

Figure 9:
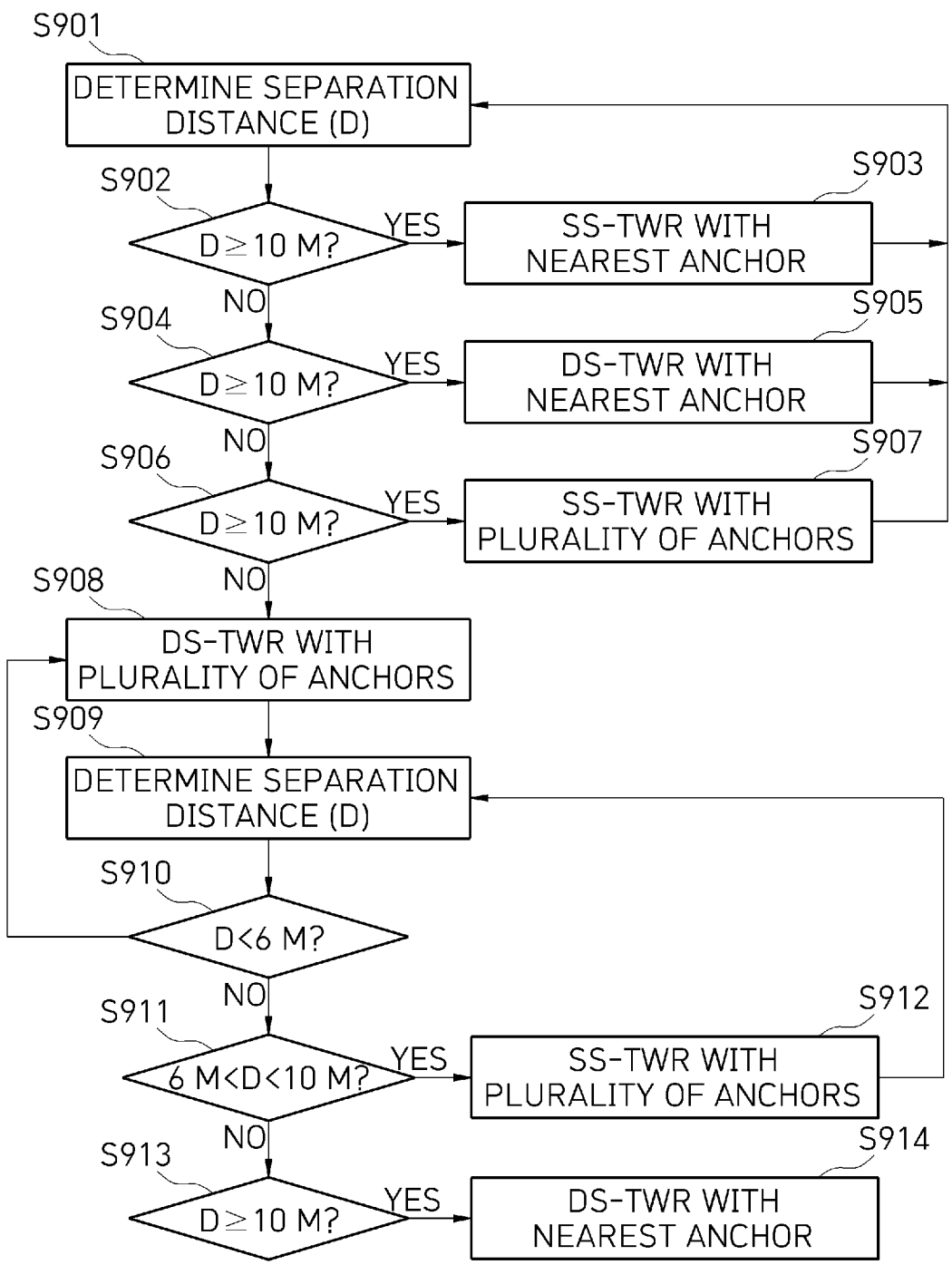
FIG. 9 shows a ranging method using a UWB system according to another embodiment of the present invention.

FIG. 9 shows a ranging method using a UWB system according to another embodiment of the present invention.

In S901, the UWB system determines a separation distance D between a tag and a vehicle. In this case, the separation distance D is a vertical distance.

In S902, the UWB system determines whether the separation distance is greater than or equal to a first set distance (e.g., 10 meters) (S913).

When it is determined in S902 that the separation distance is greater than or equal to the first set distance, the UWB system performs SS-TWR using one anchor nearest to the tag (S903).

In S904, the UWB system determines whether the separation distance is greater than or equal to a second set distance (e.g., 6 meters).

When it is determined in S904 that the separation distance is greater than or equal to the second set distance, the UWB system performs DS-TWR using one anchor nearest to the tag (S905).

In S906, the UWB system determines whether the separation distance is greater than or equal to a third set distance (e.g., 3 meters).

When it is determined in S906 that the separation distance is greater than or equal to the third set distance, the UWB system performs SS-TWR using a plurality of anchors (S907).

When SS-TWR is performed using a plurality of anchors, power consumption is greater and positioning accuracy is higher than when DS-TWR is performed using one anchor.

When it is determined in S906 that the separation distance is less than the third set distance, the UWB system performs DS-TWR using a plurality of anchors (S908).

The UWB system determines a separation distance D in S909 and determines whether the separation distance is less than the second set distance (e.g., 6 meters) in S910.

When it is determined in S910 that the separation distance is less than the second set distance, the UWB system performs DS-TWR using a plurality of anchors (S908).

When it is determined in S910 that the separation distance is greater than or equal to the second set distance, the UWB system determines whether the separation distance is greater than or equal to the second set distance (e.g., 6 meters) and is less than the first set distance (e.g., 10 meters) in S911.

When it is determined in S911 that the separation distance is greater than or equal to the second set distance and is less than the first set distance, the UWB system performs SS-TWR using a plurality of anchors (S912) and returns to operation S909 to determine a separation distance.

When the UWB system determines that a condition is not satisfied in S911, the UWB system determines whether the separation distance is greater than or equal to the first set distance (e.g., 10 meters).

When it is determined in S913 that the separation distance is greater than or equal to the first set distance, the UWB system performs DS-TWR using one anchor nearest to the tag (S914).

According to another embodiment of the present invention, when the distance between the tag and the vehicle decreases and then increases, the number of anchors and a TWR type are determined by criteria different from those when the distance between the tag and the vehicle decreases.

Figure 10A:
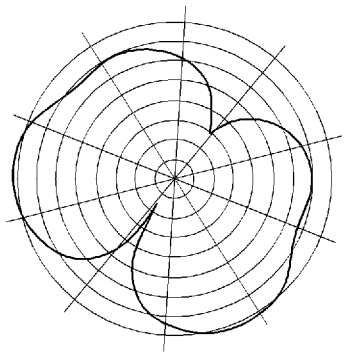
FIG. 10A to FIG. 10C show antenna diversity.
Figure 10B:
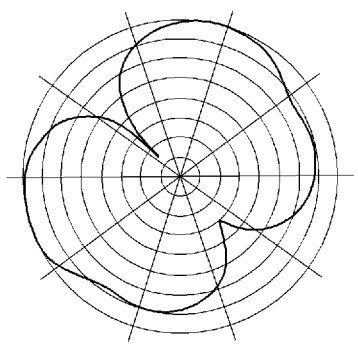
Figure 10C:
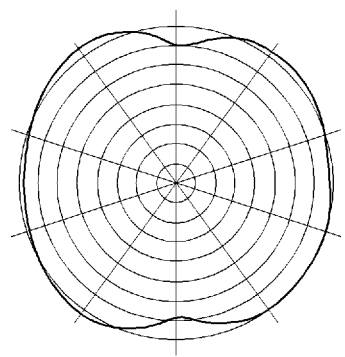

FIG. 10A to FIG. 10C show antenna diversity.

Even though a UWB antenna radiation pattern is designed as uniformly as possible, null points may be generated in the radiation pattern due to unpredictable factors such as vehicle environments and surrounding environments.

In order to solve this problem, it is possible to implement diversity by designing a plurality of antennas.

FIG. 10A shows the radiation pattern of a first antenna, and FIG. 10B shows the radiation pattern of a second antenna.

As shown in FIG. 10C, it is possible to implement diversity through the integrated radiation pattern of the first antenna and the second antenna.

When the UWB antenna diversity is implemented, reception sensitivity is improved, but the cost of implementing switching elements and antennas increases, and the module size increases. Also, ranging has to be repeated.

Figure 11:
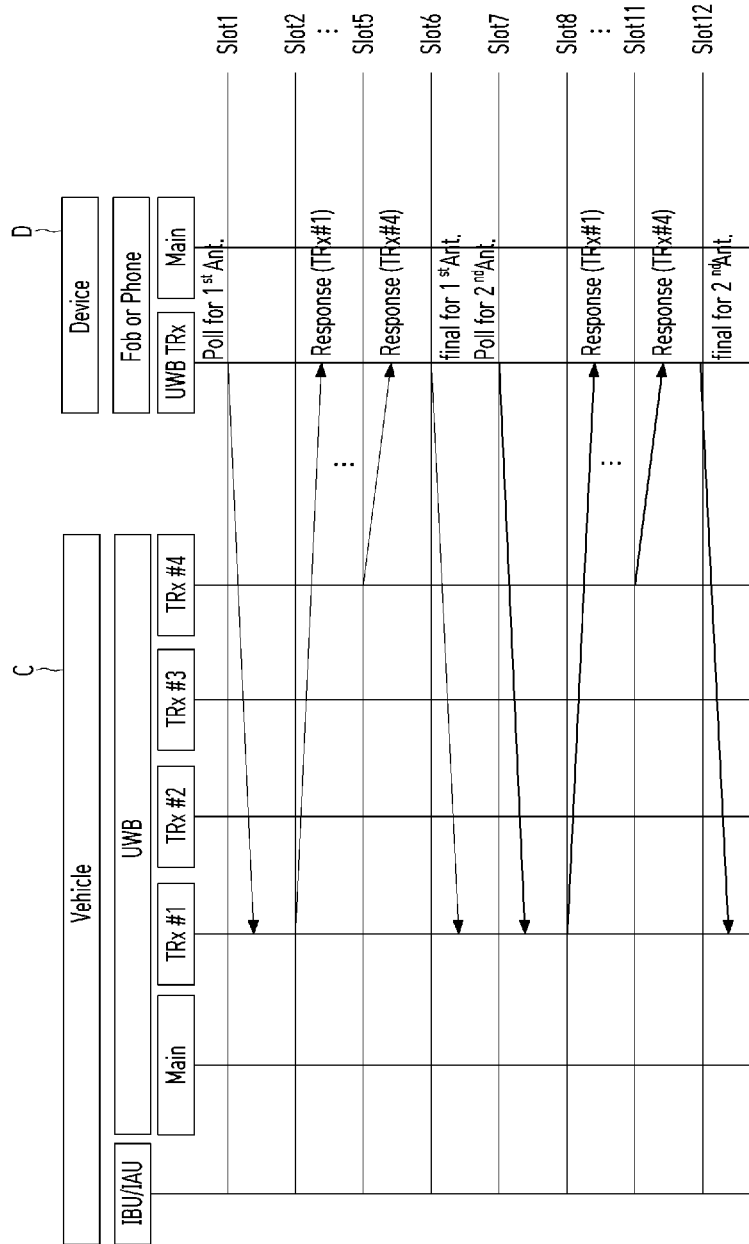
FIG. 11 shows double-sided two-way ranging (DS-TWR) according to the related art.

FIG. 11 shows a DS-TWR process according to the related art. In the DS-TWR process, two antennas are used to implement antenna diversity. Upon DS-TWR activation based on four anchors, 12 slots are needed.

Figure 12:
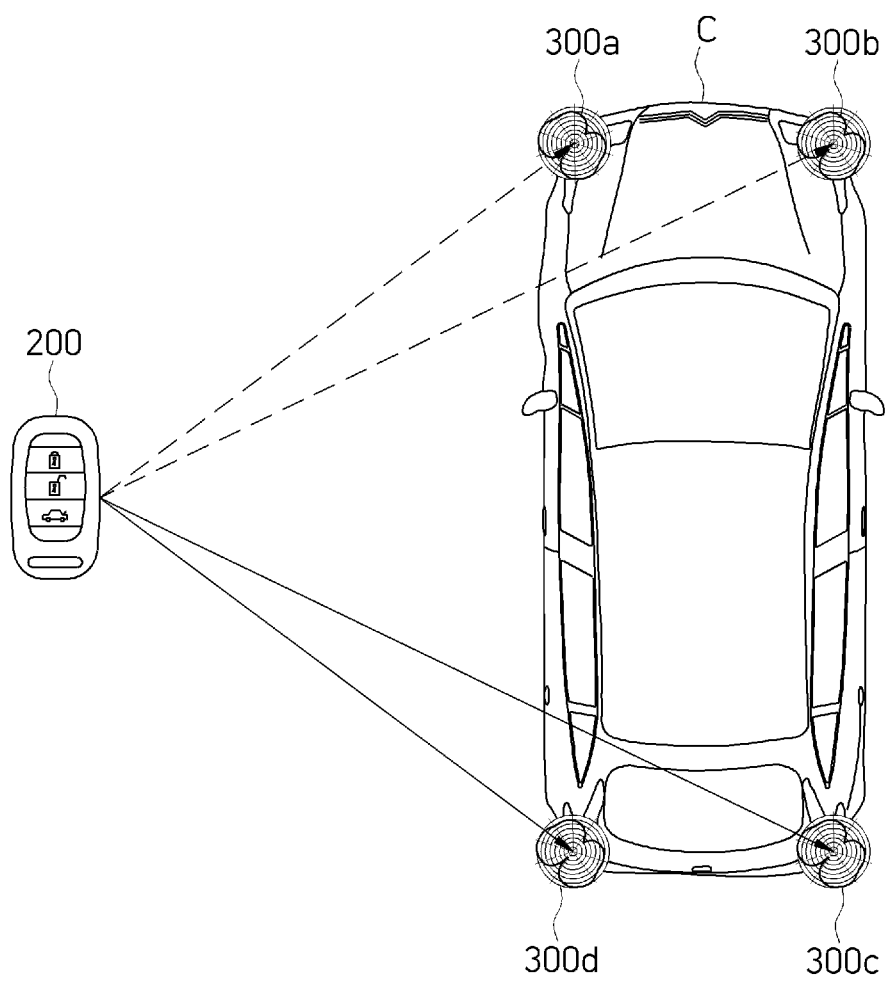
FIGS. 12 to 14 show reception performance according to another embodiment of the present invention.
Figure 13:
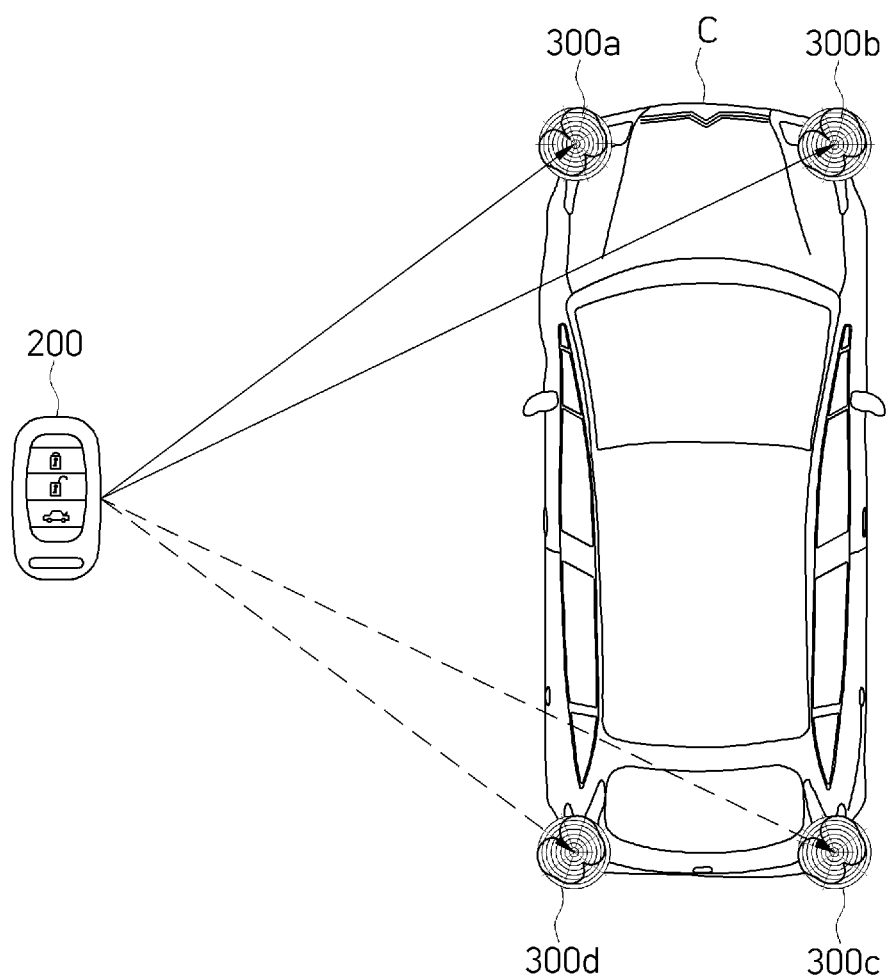
Figure 14:
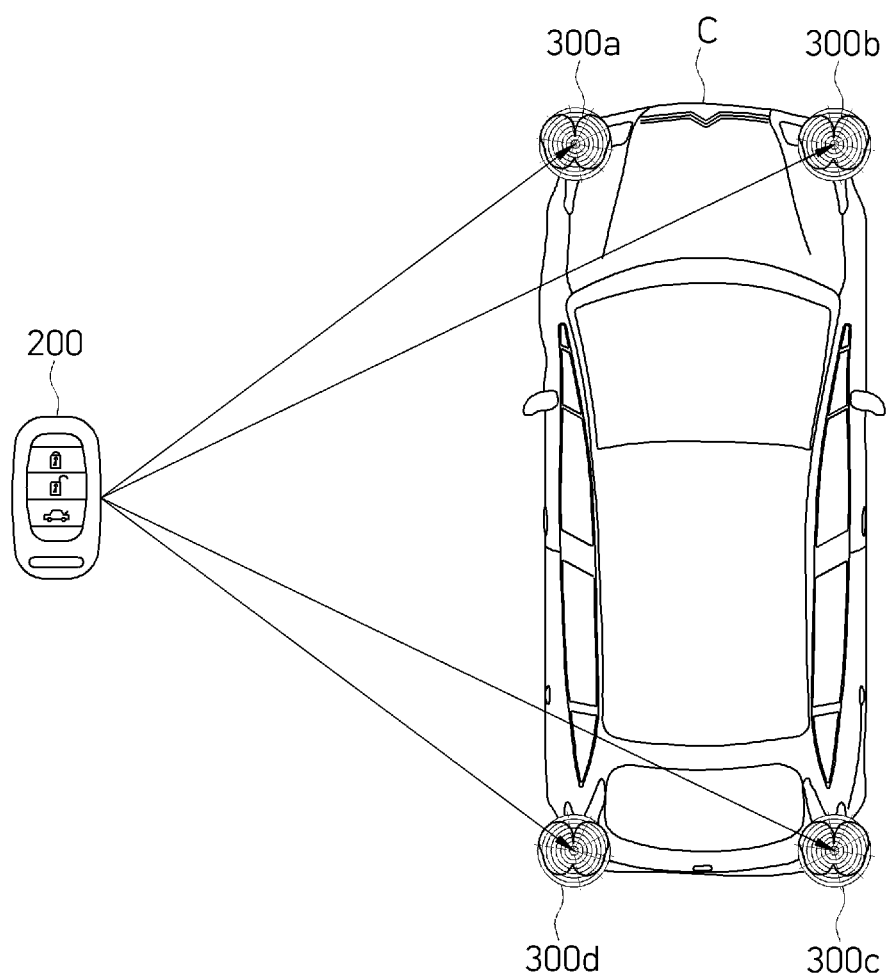
Figure 15:
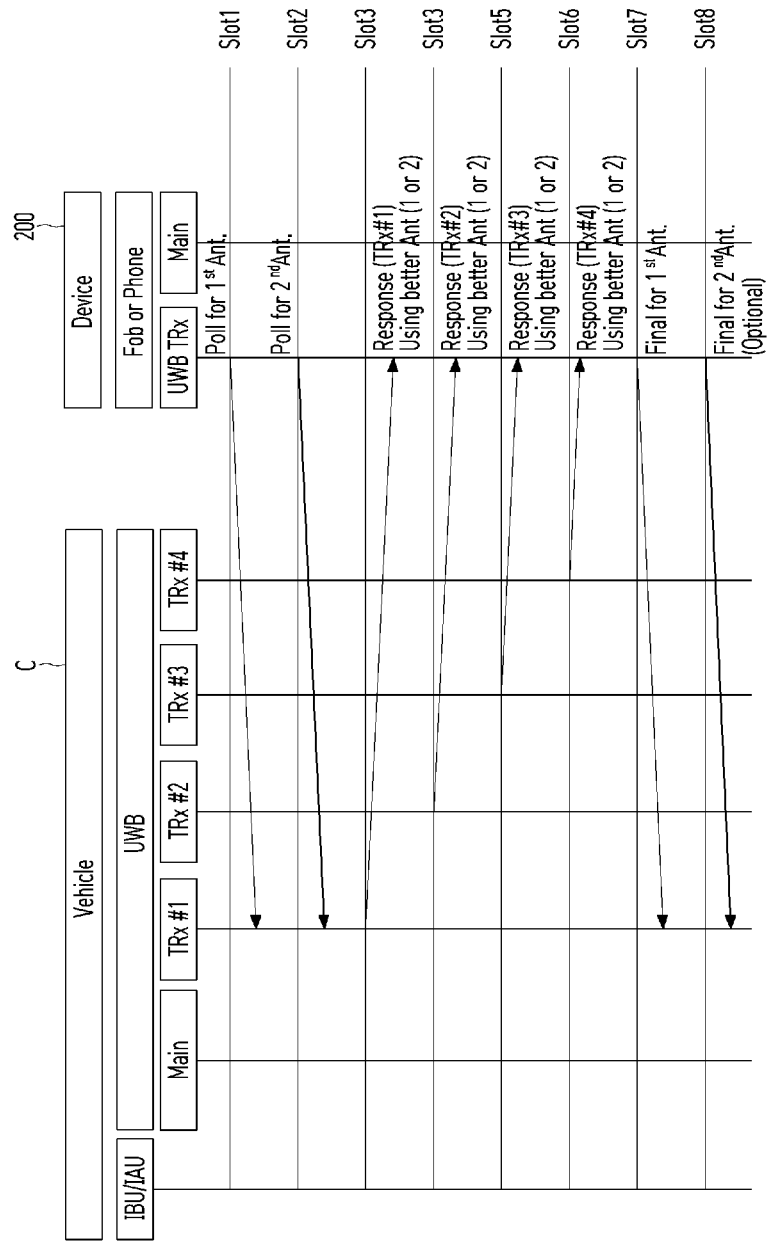
FIG. 15 shows two-way ranging according to another embodiment of the present invention.

FIGS. 12 to 14 show reception performance according to still another embodiment of the present invention, and FIG. 15 shows two-way ranging according to still another embodiment of the present invention.

A UWB system according to still another embodiment of the present invention includes an input unit for receiving a poll packet from a fob, a memory in which a program for performing ranging is embedded, and a processor which executes the program, wherein the processor selects a better antenna for each anchor from among a plurality of antennas applied to implement antenna diversity and performs ranging using the selected antenna.

The input unit receives a poll packet from the fob multiple times.

The processor selects a better antenna by using the signal strength of received data.

The processor transmits a response to the fob using the selected antenna.

The processor receives a final message from the fob using the selected antenna.

FIG. 12 shows reception performance when only a first antenna is used, FIG. 13 shows reception performance when only a second antenna is used, and FIG. 14 shows reception performance when diversity is implemented (dotted line arrows indicate poor reception performance and solid line arrows indicate good reception performance).

When the first and second antennas are provided to implement antenna diversity, a poll is transmitted from a fob to an anchor two times (a poll for the first antenna and a poll for the second antenna) in order to find the one with higher performance between the first antenna and the second antenna.

An antenna with high performance may be different for each anchor every ranging (poll-response-final).

That is, referring to FIGS. 12 to 14, the second antenna is better for a first anchor 300*a* and a second anchor 300*b*, and the first antenna is better for a third anchor 300*c* and a fourth anchor 300*d*.

Each anchor transmits a response to a fob 200 using the better antenna.

Each anchor uses the signal strength of received data (received signal strength indicator (RSSI)) to select its suitable antenna and determines that the accuracy of data increases as the signal strength increases.

When the fob 200 transmits a final message (Final), each anchor still receives the final message using the selected antenna.

FIG. 15 shows "Response(TRx #1) Using better Ant (1 or 2)," and according to the above example, a first anchor 300*a* (TRx #1) transmits a response using the second antenna.

FIG. 15 shows "Response(TRx #2) Using better Ant (1 or 2)," and according to the above example, a second anchor 300*b* (TRx #2) transmits a response using the second antenna.

FIG. 15 shows "Response(TRx #3) Using better Ant (1 or 2)," and according to the above example, a third anchor 300*c* (TRx #3) transmits a response using the first antenna.

FIG. 15 shows "Response(TRx #4) Using better Ant (1 or 2)," and according to the above example, a fourth anchor 300*d* (TRx #4) transmits a response using the first antenna.

As shown in FIG. 15, according to an embodiment of the present invention, when DS-TWR is performed based on four anchors, seven or eight slots are needed.

In the case of applying the diversity of UWB antennas, generally, the same ranging is repeated to reduce the probability of missing data. In this case, however, as described above, 12 slots are needed.

That is, in the case of using four anchors, when one antenna is used, six slots are required, but when two antennas apply antenna diversity, twelve slots, which is twice as many, are required.

However, according to still another embodiment of the present invention, only a poll is transmitted two times, and only a better antenna is selected in consideration of the reliability (e.g., signal strength) of two pieces of received data.

Since each anchor performs the next ranging through the selected antenna, finally, only one slot needs to be added, and it is possible to improve reception sensitivity with seven slots.

According to still another embodiment of the present invention, by reducing the number of slots that increase power consumption and operation time, it is possible to improve performance.

Figure 16:
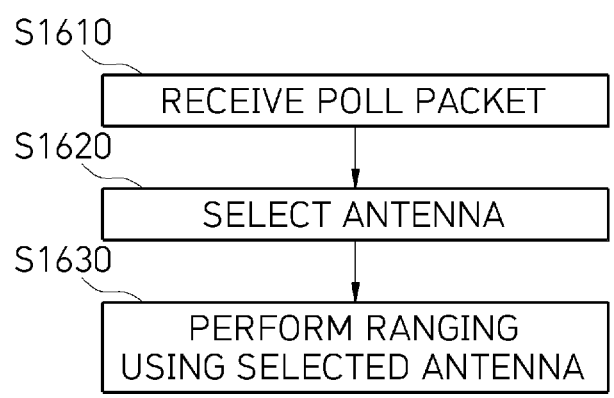
FIG. 16 shows an antenna diversity implementation method using a UWB system according to still another embodiment of the present invention.

FIG. 16 shows an antenna diversity implementation method using a UWB system according to still another embodiment of the present invention.

An anchor receives a poll packet from a fob (S1610).

The anchor selects a better antenna from among a plurality of antennas applied to implement antenna diversity according to a result of receiving the poll packet (S1620).

The anchor performs ranging by transmitting a response using the antenna selected in S1620 (S1630).

After S1630, the anchor receives a final message transmitted from the fob using the selected antenna.

When first and second antennas are provided to implement antenna diversity, a poll is transmitted from a fob to an anchor two times (the poll for the first antenna and the poll for the second antenna) in order to find the one with higher performance between the first antenna and the second antenna, and the anchor receives the poll packet in S1610.

In S1620, the anchor uses the signal strength of received data (RSSI) to select the better antenna.

Referring to FIGS. 12 to 14, each anchor has a different antenna with high performance. The second antenna is better for the first anchor 300*a* and the second anchor 300*b*, and the first antenna is better for the third anchor 300*c* and the fourth anchor 300*d*.

In S1630, each anchor transmits a response to the fob 200 using the better antenna. That is, the first anchor 300*a* and the second anchor 300*b* transmit a response using the second antenna, and the third anchor 300*c* and the fourth anchor 300*d* transmit a response using the first antenna.

After S1630, when the fob transmits a final message (Final), each anchor receives the final message still using the selected antenna.

A UWB ranging control device according to still another embodiment of the present invention includes a memory in which a UWB ranging program is embedded and a processor which executes the program, wherein the program extracts a combination of UWB anchors mounted on a vehicle for each operation scenario and performs control such that a ranging operation is performed according to priorities.

The processor extracts a combination for each operation scenario corresponding to driver seat passive keyless entry (PKE), passenger seat PKE, passive trunk, and passive start and transmits a wake-up signal.

The processor performs control such that primary ranging is performed using a UWB anchor for which it is determined to be easy to find a device for each operation scenario and which is given a higher priority. When the ranging result is a failure, the processor performs control such that secondary ranging is sequentially performed using a UWB anchor which is given a lower priority.

The processor determines whether to perform RSA using at least one of the result of the primary ranging and the result of the secondary ranging and determines whether to perform the operation.

FIG. 17 shows a UWB module driven for each operation scenario according to still another embodiment of the present invention.

A vehicle is equipped with first to seventh UWB modules 210 to 270. The first UWB module 210, the second UWB module 220, the third UWB module 230, and the fourth UWB module 240 are installed on a bumper outside the vehicle, and the fifth UWB module 250, the sixth UWB module 260, and the seventh UWB module 270 are installed in the vehicle (e.g., a roof).

According to the related art, only four UWB modules installed outside the vehicle are used, but according to an embodiment of the present invention, the combination of driven UWB modules is different depending on the usage scenario.

Upon driver seat PKE operation, the first UWB module 210, the fourth UWB module 240, the fifth UWB module 250, and the seventh UWB module 270 are driven.

Upon passenger seat PKE operation, the second UWB module 220, the third UWB module 230, the fifth UWB module 250, and the sixth UWB module 260 are driven.

Upon passive trunk operation, the third UWB module 230, the fourth UWB module 240, the sixth UWB module 260, and the seventh UWB module 270 are driven.

Upon passive start operation, the first UWB module 210, the fifth UWB module 250, the sixth UWB module 260, and the seventh UWB module 270 are driven.

That is, according to still another embodiment of the present invention, four UWB modules are driven. At this point, the most necessary UWB modules are selectively driven depending on the driver seat PKE, passive trunk, and passive start scenarios.

Figure 18A:
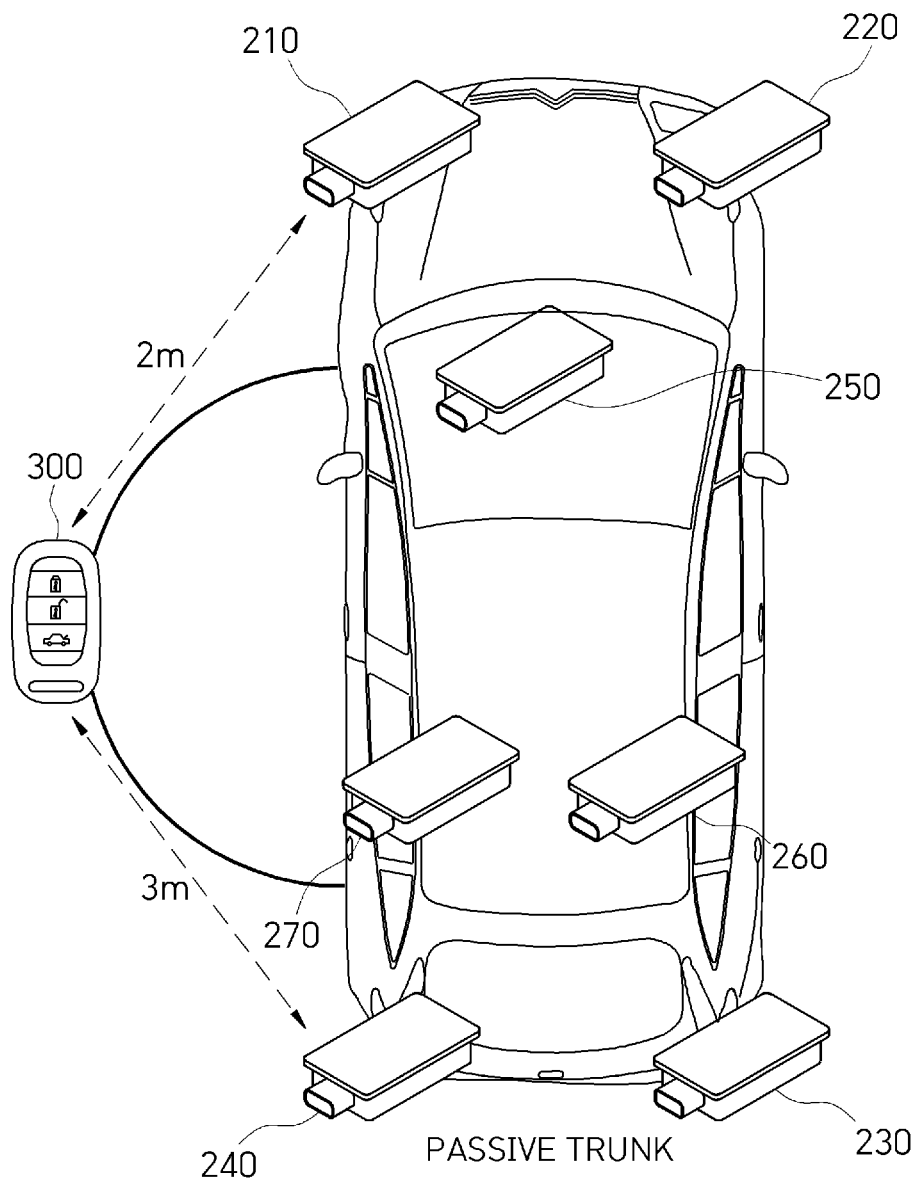
FIG. 18A and FIG. 18B show primary and secondary operations of a UWB module upon driver seat passive keyless entry (PKE) operation according to still another embodiment of the present invention.
Figure 18B:
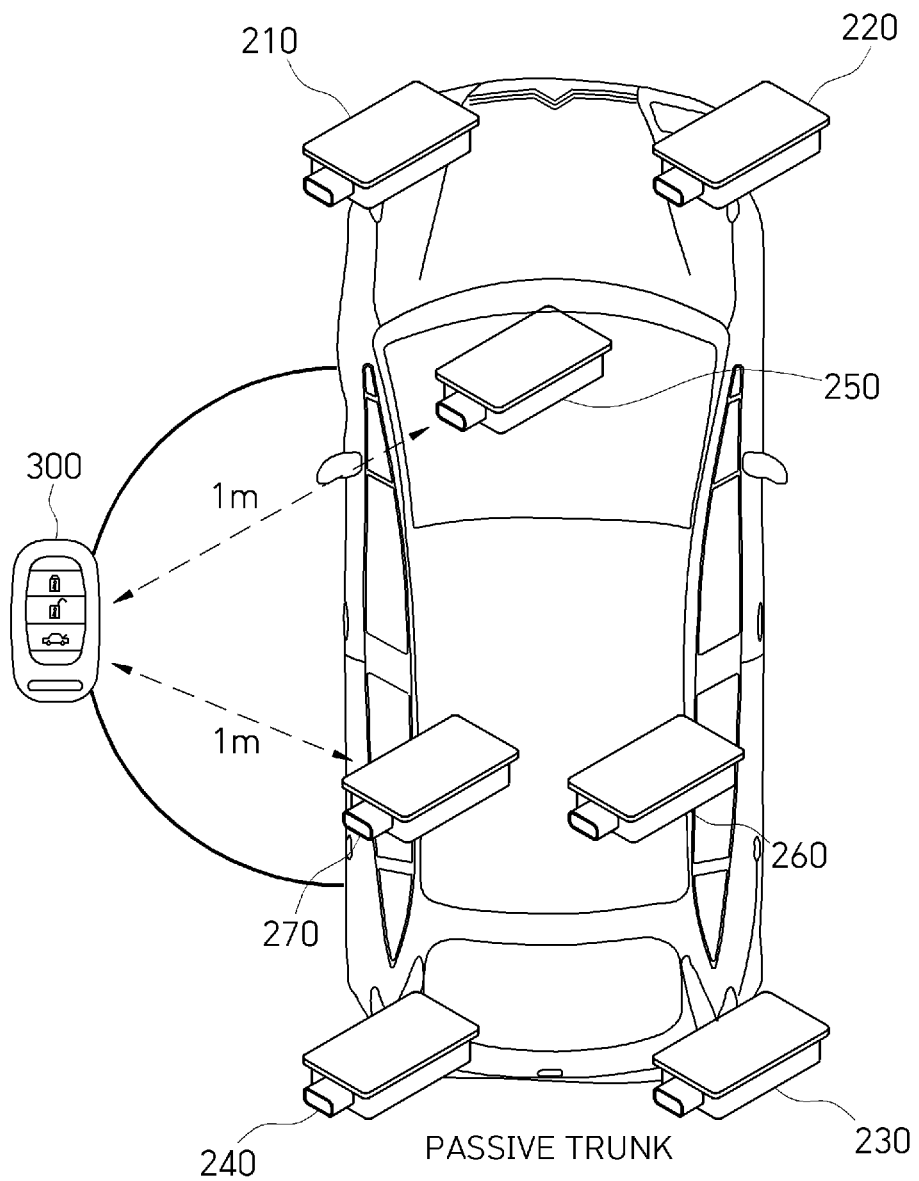

FIG. 18A and FIG. 18B show primary and secondary operations of a UWB module upon driver seat PKE operation.

According to still another embodiment of the present invention, the first UWB module 210, the fourth UWB module 240, the fifth UWB module 250, and the seventh UWB module 270 are driven as described above. These UWB modules are not activated all at once, but are divisionally driven in primary and secondary operations in consideration of optimization in terms of power and time.

First, referring to FIG. 18A, first, the first UWB module 210 and the fourth UWB module 240 perform ranging as the primary operation. When a device (UWB fob) 300 is found in a certain region, the corresponding operation is completed.

Referring to FIG. 18B, the fifth UWB module 250 and the seventh UWB module 270 perform additional ranging as the secondary operation when the ranging of the first UWB module 210 and the fourth UWB module 240 fails for any reason during the primary operation process.

Since the above-described sequential primary and secondary operations are directed to a device approaching from the side of the bumper during the driver seat PKE, a UWB module corresponding to conditions in which it is easiest to find the device is operated first.

Also, in special cases (e.g., when a vehicle is surrounded by many people), ranging using the first UWB module 210 and the fourth UWB module 240 placed on the bumper is not possible. In this case, ranging is performed using the fifth UWB module 250 and the seventh UWB module 270 mounted on the inner roof of the vehicle and configured to view from the top down.

Figure 19:
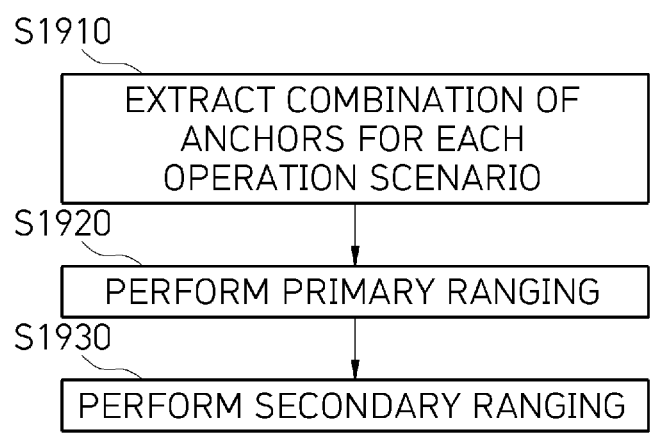
FIGS. 19 to 21 show a UWB ranging method according to still another embodiment of the present invention.
Figure 20:
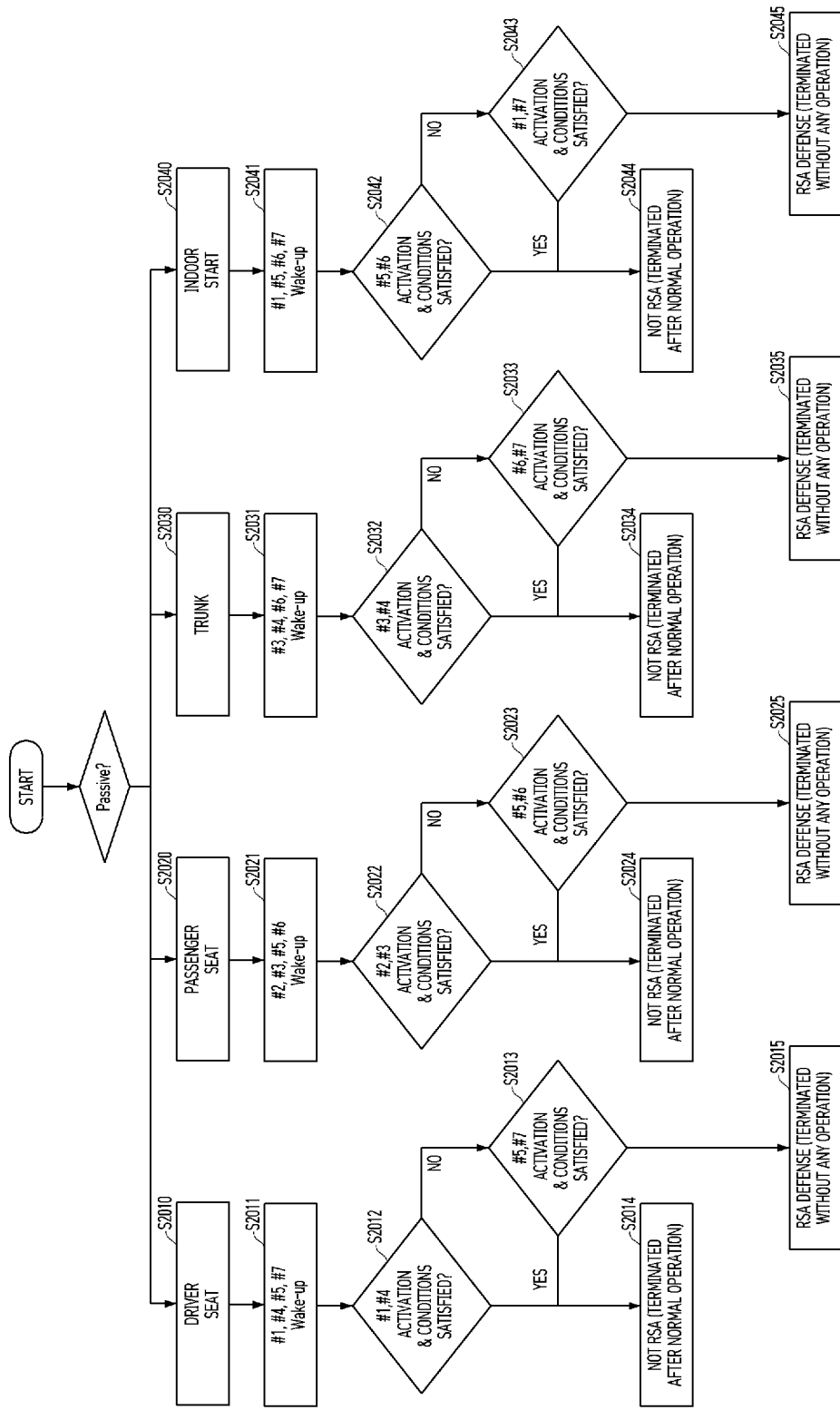
Figure 21:
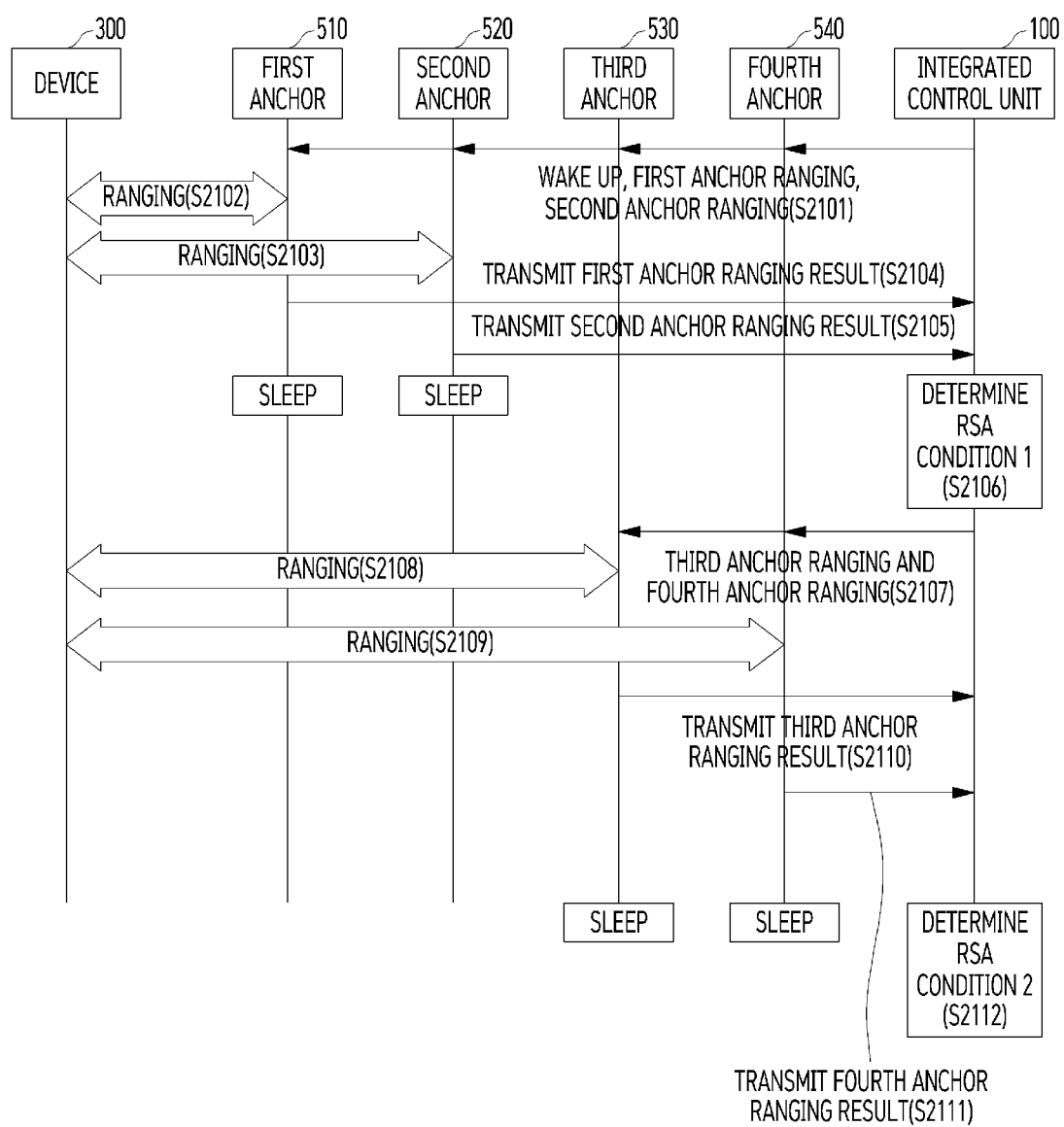

FIGS. 19 to 21 show a UWB ranging method according to still another embodiment of the present invention.

Referring to FIG. 19, the UWB ranging method according to still another embodiment of the present invention includes extracting a combination of UWB anchors installed in a vehicle for each operation scenario (S1910), performing primary ranging using the UWB anchor with a higher priority included in the extracted combination of UWB anchors (S1920), and performing secondary ranging using the UWB anchors with a lower priority included in the extracted combination of UWB anchors (S1930).

In S1910, the UWB ranging method includes extracting a combination for each operation scenario corresponding to driver seat PKE, passenger seat PKE, passive trunk, and passive start.

In S1920, the UWB ranging method includes performing primary ranging using a UWB anchor for which it is determined to be easy to find a device for each operation scenario and which is given a higher priority and transmitting a result of the ranging to an integrated control unit.

In S1930, the UWB ranging method includes performing secondary ranging using a UWB anchor given a lower priority when the ranging result is a fail in S1920.

Referring to FIG. 20, first, the UWB ranging method includes determining a passive situation (S2001). Each operation is performed differently according to the four operation scenarios. In this case, an anchor driven for each operation may be changed due to a factor such as a vehicle layout, etc.

Upon driver seat PKE operation (S2010), the UWB ranging method includes transmitting activation (wake-up) signals for the first UWB module 210, the fourth UWB module 240, the fifth UWB module 250, and the seventh UWB module 270 (S2011).

Subsequently, the UWB ranging method includes, as the primary operation, performing ranging using the first UWB module 210 and the fourth UWB module 240 and determining whether an RSA condition corresponding to a result of the ranging is satisfied (S2012).

When it is determined in S2012 that the condition corresponding to the ranging result is satisfied, the UWB ranging method includes determining that RSA is not applied and terminating the processing after normal operation (S2014).

When it is determined in S2012 that the condition corresponding to the ranging result is not satisfied, the UWB ranging method includes, as the secondary operation, performing ranging using the fifth UWB module 250 and the seventh UWB module 270 and determining whether an RSA condition corresponding to a result of the ranging is satisfied (S2013).

When it is determined in S2013 that the condition corresponding to the ranging result is satisfied, the UWB ranging method includes determining that RSA is not applied and terminating the processing after normal operation (S2014). When it is determined in S2013 that the condition corresponding to the ranging result is not satisfied, the UWB ranging method includes performing RSA defense and terminating the processing without any operation (S2015).

Upon passenger seat PKE operation (S2020), the UWB ranging method includes transmitting activation (wake-up) signals for the second UWB module 220, the third UWB module 230, the fifth UWB module 250, and the sixth UWB module 260 (S2021).

Subsequently, the UWB ranging method includes, as the primary operation, performing ranging using the second UWB module 220 and the third UWB module 230 and determining whether an RSA condition corresponding to a result of the ranging is satisfied (S2022).

When it is determined in S2022 that the condition corresponding to the ranging result is satisfied, the UWB ranging method includes determining that RSA is not applied and terminating the processing after normal operation (S2024).

When it is determined in S2022 that the condition corresponding to the ranging result is not satisfied, the UWB ranging method includes, as the secondary operation, performing ranging using the fifth UWB module 250 and the sixth UWB module 260 and determining whether an RSA condition corresponding to a result of the ranging is satisfied (S2023).

When it is determined in S2023 that the condition corresponding to the ranging result is satisfied, the UWB ranging method includes determining that RSA is not applied and terminating the processing after normal operation (S2024). When it is determined in S2023 that the condition corresponding to the ranging result is not satisfied, the UWB ranging method includes performing RSA defense and terminating the processing without any operation (S2025).

Upon passive trunk operation (S2030), the UWB ranging method includes transmitting activation (wake-up) signals for the third UWB module 230, the fourth UWB module 240, the sixth UWB module 260, and the seventh UWB module 270 (S2031).

Subsequently, the UWB ranging method includes, as the primary operation, performing ranging using the third UWB module 230 and the fourth UWB module 240 and determining whether an RSA condition corresponding to a result of the ranging is satisfied (S2032).

When it is determined in S2032 that the condition corresponding to the ranging result is satisfied, the UWB ranging method includes determining that RSA is not applied and terminating the processing after normal operation (S2034).

When it is determined in S2032 that the condition corresponding to the ranging result is not satisfied, the UWB ranging method includes, as the secondary operation, performing ranging using the sixth UWB module 260 and the seventh UWB module 270 and determining whether an RSA condition corresponding to a result of the ranging is satisfied (S2033).

When it is determined in S2033 that the condition corresponding to the ranging result is satisfied, the UWB ranging method includes determining that RSA is not applied and terminating the processing after normal operation (S2034).

When it is determined in S2033 that the condition corresponding to the ranging result is not satisfied, the UWB ranging method includes performing RSA defense and terminating the processing without any operation (S2035).

Upon passive start operation (S2040), the UWB ranging method includes transmitting activation (wake-up) signals for the first UWB module 210, the fifth UWB module 250, the sixth UWB module 260, and the seventh UWB module 270 (S2041).

Subsequently, the UWB ranging method includes, as the primary operation, performing ranging using the fifth UWB module 250 and the sixth UWB module 260 and determining whether an RSA condition corresponding to a result of the ranging is satisfied (S2042).

When it is determined in S2042 that the condition corresponding to the ranging result is satisfied, the UWB ranging method includes determining that RSA is not applied and terminating the processing after normal operation (S2044).

When it is determined in S2042 that the condition corresponding to the ranging result is not satisfied, the UWB ranging method includes, as the secondary operation, performing ranging using the first UWB module 210 and the seventh UWB module 270 and determining whether the RSA condition corresponding to the ranging result is satisfied (S2043).

When it is determined in S2043 that the condition corresponding to the ranging result is satisfied, the UWB ranging method includes determining that RSA is not applied and terminating the processing after normal operation (S2044). When it is determined in S2043 that the condition corresponding to the ranging result is not satisfied, the UWB ranging method includes performing RSA defense and terminating the processing without any operation (S2045).

Referring to FIG. 21, it is assumed that first to fourth anchors 510 to 540 are anchors corresponding to an optimal combination that is driven according to an operation scenario.

An integrated control unit 100 transmits a wake-up signal and ranging signals for the first anchor 510 and the second anchor 520 (S2101).

Ranging is performed between the device 300 and the first anchor 510 (S2102) and between the device 300 and the second anchor 520 (S2103), the first anchor 510 transmits a ranging result of the first anchor 510 to the integrated control unit 100 (S2104), and the second anchor 520 transmits a ranging result of the second anchor 520 to the integrated control unit 100 (S2105).

The integrated control unit 100 determines whether RSA condition 1 is satisfied using the ranging result of the first anchor 510 and the ranging result of the second anchor 520 (S2106).

Subsequently, the integrated control unit 100 transmits ranging signals for the third anchor 530 and the fourth anchor 540 (S2107).

Ranging is performed between the device 300 and the third anchor 530 (S608) and between the device 300 and the fourth anchor 540 (S609), the third anchor 530 transmits a ranging result of the third anchor 530 to the integrated control unit 100 (S2110), and the fourth anchor 540 transmits a ranging result of the fourth anchor 540 to the integrated control unit 100 (S2111).

The integrated control unit 100 determines whether RSA condition 2 is satisfied using the ranging result of the third anchor 530 and the ranging result of the fourth anchor 540 (S2112).

Figure 22:
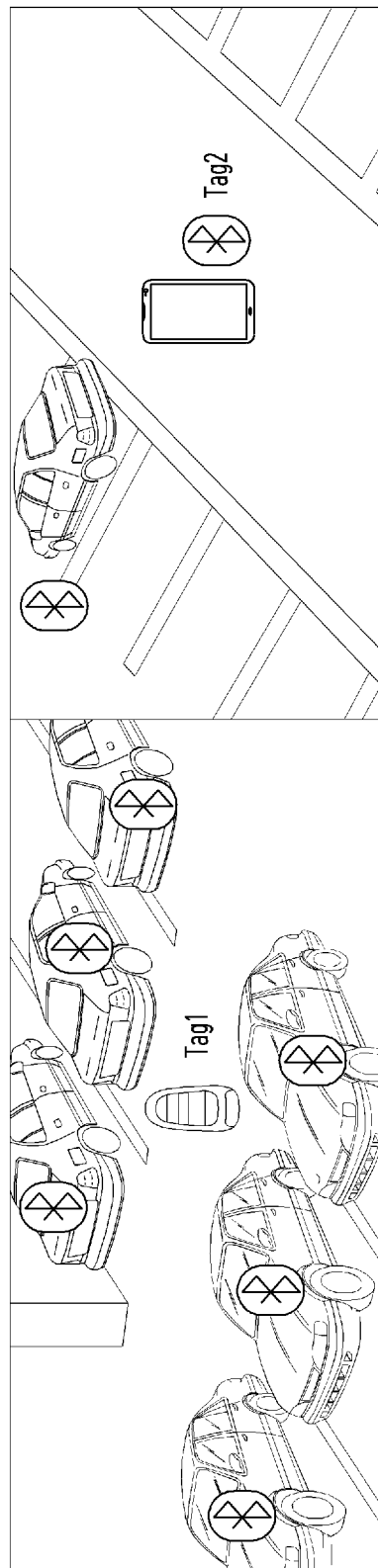
FIG. 22 shows a UWB operation environment according to the related art.

FIG. 22 shows a UWB operation environment according to the related art.

In an environment with many vehicles, the UWB communication of Tag1 is affected by surroundings thereof, and thus an inaccurate ranging result is derived.

In this case, the surrounding influences include an influence due to a steel component of a nearby vehicle, an influence due to a wireless communication noise component, and the like.

In an environment with no vehicles, the UWB communication of Tag2 is not affected by surroundings, and thus a relatively accurate ranging result is derived.

Figure 23:
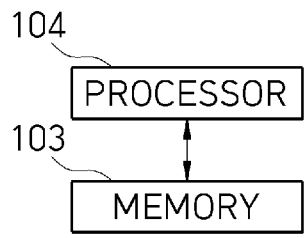
FIG. 23 shows a UWB system using a sniffing result according to still another embodiment of the present invention.

FIG. 23 shows a UWB system using a sniffing result according to still another embodiment of the present invention.

The UWB system according to still another embodiment of the present invention includes a memory 103 with a program for performing UWB ranging by referring to the sniffing result and a processor 104 that executes the program, and the processor 104 changes the UWB ranging method or changes the UWB ranging period in consideration of the sniffing result.

The processor 104 performs UWB ranging in the SS-TWR scheme, monitors the sniffing result, and determines whether the sniffing result exceeds a first preset value.

When it is determined that the sniffing result does not exceed the first preset value, the processor 104 continues to perform the UWB ranging in the SS-TWR scheme.

When it is determined that the sniffing result exceeds the first preset value, the processor 104 determines whether the sniffing result exceeds a second preset value.

When it is determined that the sniffing result does not exceed the second preset value, the processor 104 changes the UWB ranging method to the DS-TWR scheme and performs UWB ranging in the DS-TWR scheme.

When it is determined that the sniffing result exceeds the second preset value, the processor 104 changes the period of the UWB ranging and performs the UWB ranging in the DS-TWR scheme. For example, the processor 104 halves the period of the UWB ranging.

According to still another embodiment of the present invention, in order to determine surrounding environment information of a vehicle with which a tag communicates, the environment information is predicted through wireless communication sniffing, and the sniffing is defined as a process of monitoring and capturing all packets passing through a designated network.

The medium of the sniffing may be various wireless communication schemes (e.g., Bluetooth Low Energy (BLE), UWB, Wi-Fi, etc.), and a wireless communication scheme used in more vehicles can predict a surrounding environment more accurately.

According to an embodiment of the present invention, by distinguishing a case in which the surrounding environment is not good and a case in which the surrounding environment is good and by changing a UWB ranging period and method, it is possible to minimize power consumption and enable precise positioning.

Figure 24:
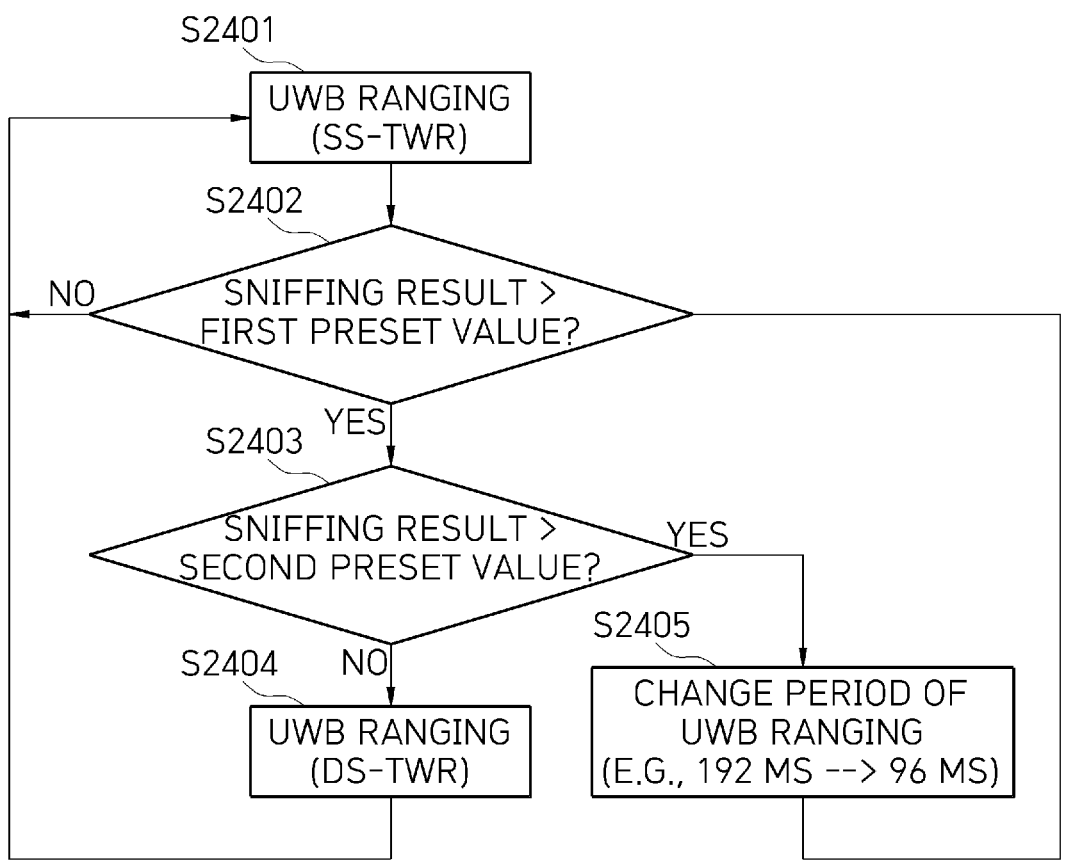
FIG. 24 illustrates a UWB operation method using a sniffing result according to still another embodiment of the present invention.

FIG. 24 shows a UWB operation method using a sniffing result according to still another embodiment of the present invention.

The UWB operation method according to still another embodiment of the present invention includes (a) monitoring a sniffing result while performing UWB ranging and (b) changing a UWB ranging method or changing a UWB ranging period depending on the sniffing result.

Referring to FIG. 24, the UWB operation method includes performing the UWB ranging in the SS-TWR scheme (S2401).

The UWB operation method includes monitoring the sniffing result and determining whether the sniffing result exceeds a first preset value (S2402).

When it is determined in S2402 that the sniffing result does not exceed the first preset value, the UWB operation method includes continuing to perform the UWB ranging in the SS-TWR scheme (S2401).

When it is determined in S2402 that the sniffing result exceeds the first preset value, the UWB operation method includes determining whether the sniffing result exceeds a second preset value (S2403).

When it is determined in S2403 that the sniffing result does not exceed the second preset value, the UWB operation method includes performing UWB ranging in the DS-TWR scheme (S2404).

When it is determined in S2403 that the sniffing result exceeds the second preset value, the UWB operation method includes changing the period of the UWB ranging and performing the UWB ranging in the DS-TWR scheme (S2405).

In this case, for example, the period of the UWB ranging is halved.

Figure 25:
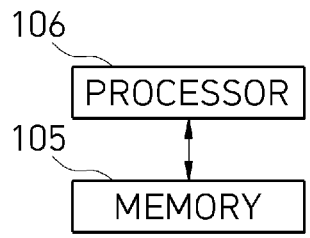
FIG. 25 shows a distance-based UWB system according to still another embodiment of the present invention.

FIG. 25 shows a distance-based UWB system according to still another embodiment of the present invention.

A distance-based UWB system according to still another embodiment of the present invention includes a memory 105 in which a ranging program corresponding to a separation distance between a tag and a vehicle is embedded and a processor 106 which executes the program, wherein the processor 106 determines an anchor to perform ranging and a ranging scheme according to the separation distance.

When the separation distance is less than a first preset distance, the processor 106 performs ranging in the DS-TWR scheme using N anchors.

When the separation distance is greater than or equal to the first preset distance and is less than a second preset distance, the processor 106 performs ranging in the DS-TWR scheme using an anchor of a vehicle closest to the tag.

When the separation distance is greater than or equal to the second preset distance, the processor 106 performs ranging in the SS-TWR scheme using an anchor of a vehicle closest to the tag.

Figure 26:
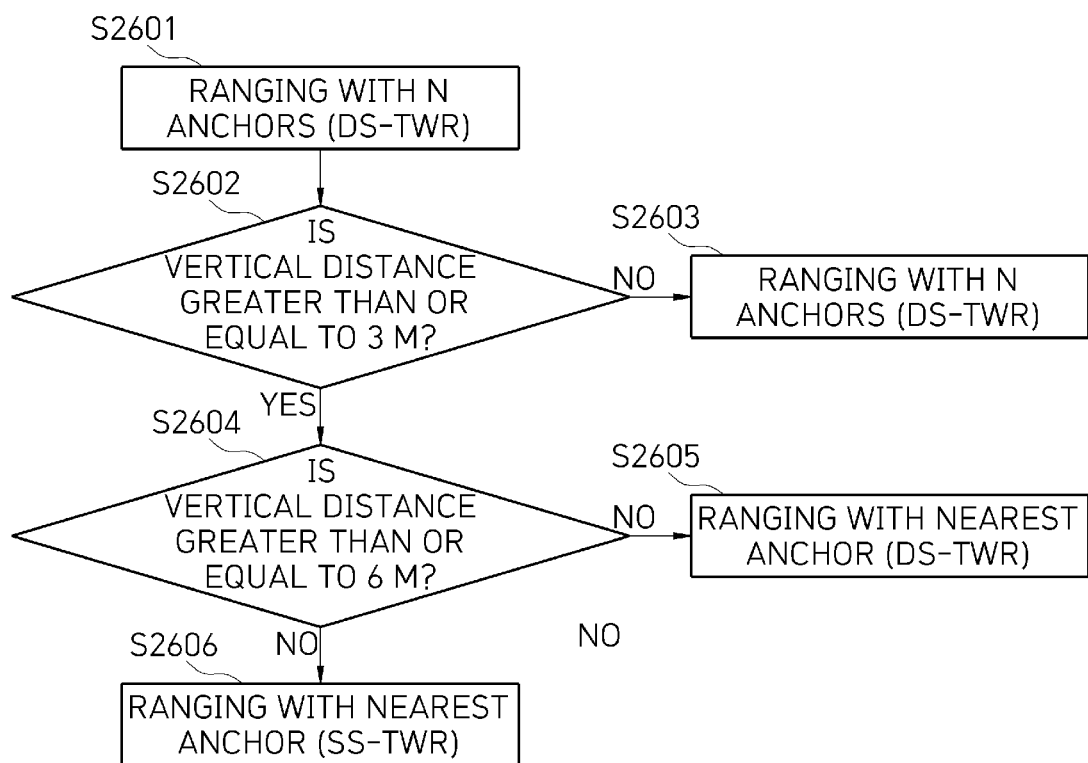
FIG. 26 shows a distance-based UWB operation method according to still another embodiment.

FIG. 26 shows a distance-based UWB operation method according to still another embodiment.

The distance-based UWB operation method according to still another embodiment of the present invention is a UWB ranging method in the case in which a tag becomes far away.

A distance-based UWB operation method according to still another embodiment of the present invention includes (a) receiving information regarding a separation distance between a tag and a vehicle and (b) determining an anchor to perform ranging and a ranging scheme according to the separation distance.

In operation (a), the distance-based UWB operation method includes receiving information regarding a vertical distance between a tag and a vehicle.

In operation (b), when the separation distance is less than a first preset distance, the distance-based UWB operation method includes performing ranging in the DS-TWR scheme using N anchors.

In operation (b), when the separation distance is greater than or equal to the first preset distance and is less than a second preset distance, the distance-based UWB operation method includes performing ranging in the DS-TWR scheme using an anchor of a vehicle closest to the tag.

In operation (b), when the separation distance is greater than or equal to the second preset distance, the distance-based UWB operation method includes performing ranging in the SS-TWR scheme using an anchor of a vehicle closest to the tag.

When the tag approaches, UWB ranging is performed in a more accurate scheme according to an application.

Referring to FIG. 26, the distance-based UWB operation method includes performing ranging in the DS-TWR scheme using N anchors within a first preset distance (e.g., 3 meters) in S2601.

Referring to FIG. 26, the distance-based UWB operation method includes determining whether the vertical distance is greater than or equal to a first preset distance (e.g., 3 meters) in S2602.

When it is determined in S2602 that the vertical distance is less than the first preset distance, the distance-based UWB operation method includes continuing to perform ranging in the DS-TWR scheme using N anchors in S2603.

The distance-based UWB operation method includes determining whether the vertical distance is greater than or equal to the second preset distance (e.g., 6 meters) in S2604.

When it is determined in S2604 that the vertical distance is less than the second preset distance, that is, when it is determined that the vertical distance is greater than or equal to the first preset distance and is less than the second preset distance, the distance-based UWB operation method includes performing ranging in the DS-TWR scheme using the nearest anchor in S2605 in order to minimize power consumption instead of performing ranging in the SS-TWR scheme using N anchors.

When it is determined in S2604 that the vertical distance is greater than or equal to the second preset distance, the distance-based UWB operation method includes performing ranging in the SS-TWR scheme using the nearest anchor in S2606.

According to still another embodiment of the present invention, when a tag moves away and back again, the original condition is restored.

That is, when the vertical distance is changed from greater than or equal to the second preset distance to greater than or equal to the first preset distance and less than the second preset distance, the ranging method is also changed such that the ranging is performed in the SS-TWR scheme using N anchors rather than in the SS-TWR scheme using one anchor.

Also, when the vertical distance is changed from greater than or equal to the first preset distance and less than the second present distance to less than the first preset distance, the ranging method is also changed such that the ranging is performed in the DS-TWR scheme using N anchors rather than in the DS-TWR scheme using one anchor.

According to another embodiment of the present invention, it is possible to minimize power consumption in UWB ranging and also to respond appropriately to the situation.

That is, when several anchors continuously range a remote tag, power consumption is severe and operation time is long. Thus, by actuating only one anchor, it is possible to minimize power consumption, and also, by reducing the number of anchors that perform UWB ranging and by simplifying the method of performing UWB ranging (from DS-TWR to SS-TWR), it is possible to efficiently perform the UWB ranging operation.

Figure 27:
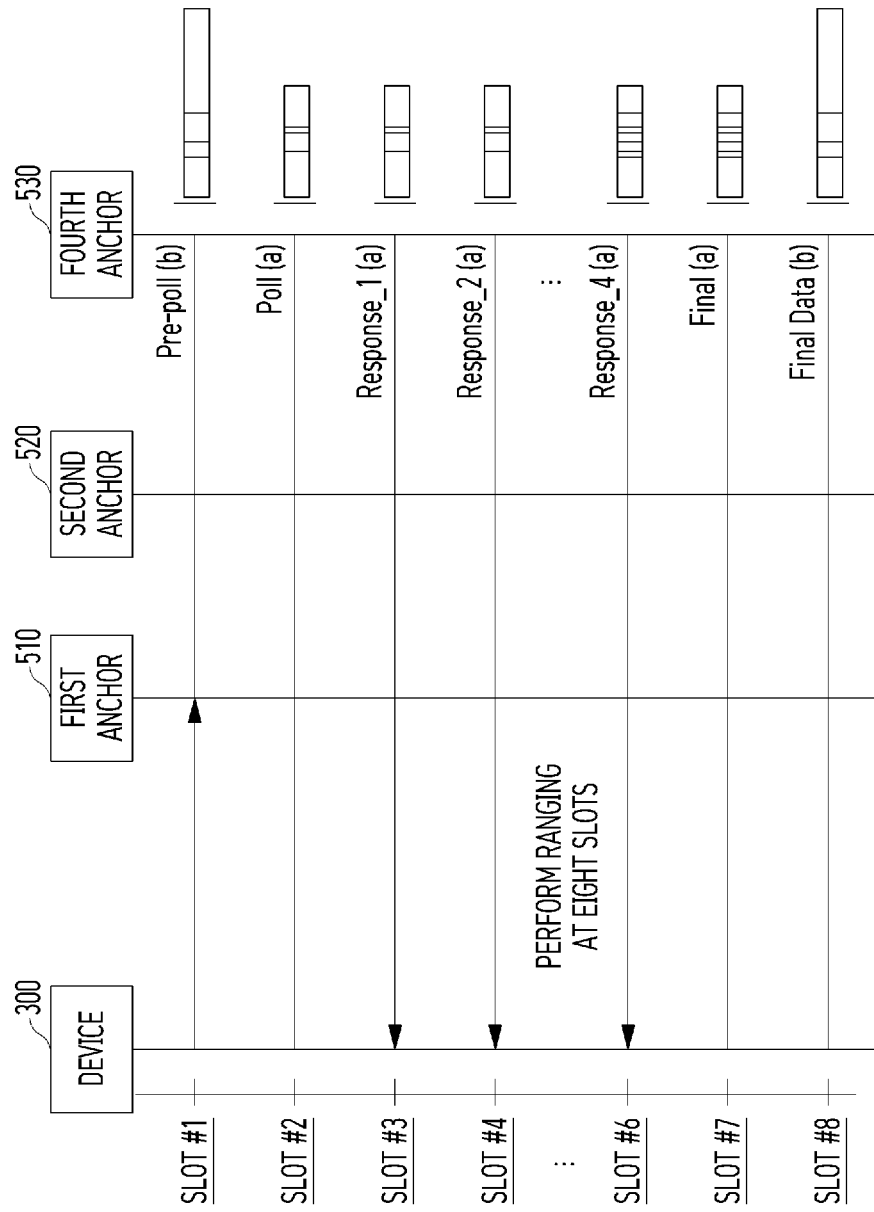
FIG. 27 shows a UWB ranging sequence that is defined by the Car Connectivity Consortium (CCC) standard on the basis of four anchors.

FIG. 27 shows a UWB ranging sequence that is defined by the Car Connectivity Consortium (CCC) standard on the basis of four anchors.

A frame format used for UWB ranging includes a structure including a scrambled timestamp sequence STS in order to put a timestamp, a structure including a payload without an STS in order to transmit data such as a timestamp, etc.

Referring to FIG. 27, a device 10 transmits a pre-poll to first to fourth anchors 21 to 24 in slot #1. In this case, the device 10 uses a frame format of a structure including a payload without an STS in order to transmit data such as a timestamp.

The device 10 transmits a poll to the first to fourth anchors 21 to 24 in slot #2. In this case, the device 10 uses a frame format of a structure including an STS in order to put a timestamp.

The first to fourth anchors 21 to 24 transmits a response to the device 10 in slots #3 to #6, and the device 10 transmits a final message (Final) to the first to fourth anchors 21 to 24 in slot #7.

The device 10 transmits final data to first to fourth anchors 21 to 24 in slot #8. In this case, the device 10 uses a frame format of a structure including a payload without the STS in order to transmit data as with the pre-poll transmission.

According to the related art, digital-key (smartphone) UWB ranging follows an operation sequence defined by the international standard such as the CCC.

According to the related art, the corresponding standard association suggests that various ranging factors (e.g., STS indices, encryption keys, etc.) that need to be selected for UWB communication should be exchanged with smartphones using other communication means (NFC, BLE, etc.) through pre-handshaking.

However, the smart key system according to the related art has restrictions on the use of such communication means (NFC, BLE, etc,) and the pre-exchange of keys.

A UWB system using a UWB ranging factor definition according to still another embodiment of the present invention selects a ranging factor and maintains the same level of security when applying a UWB ranging sequence defined by the international standard (CCC).

According to another embodiment of the present invention, by applying the UWB Ranging sequence defined by the international standard (CCC), it is possible to provide a communication scheme optimized by physical characteristics of UWB (e.g., communication interference due to NLOS-obstacle interference).

According to still another embodiment of the present invention, it is possible to most efficiently derive a ranging factor that needs to be predefined, and it is also possible to share the ranging factor between a vehicle and a smart key so that the UWB ranging defined by the international standard is available while the current smart key system is used.

Figure 28:
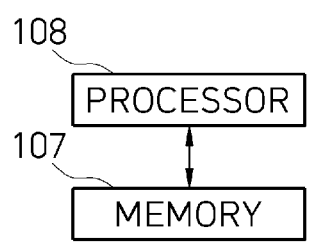
FIG. 28 shows a UWB system using a UWB ranging factor definition according to still another embodiment of the present invention.

FIG. 28 shows a UWB system using a UWB ranging factor definition according to still another embodiment of the present invention.

The UWB system using the UWB ranging factor definition according to still another embodiment of the present invention includes a memory 107 in which a UWB ranging factor definition program is embedded and a processor 108 which executes the program, wherein the processor 108 predefines UWB ranging factors to define an STS index, an encryption key, and a nonce.

The processor 108 defines an STS index as plaintext that has to be encrypted to generate an STS.

The processor 108 defines STS encryption key, Data encryption key, and STS Index encryption key as encryption keys.

The processor 108 defines Salt, Source Address, and RandomCounter as nonces.

The processor 108 defines STS indices, encryption keys, and nonces in consideration of characteristic information by using encryption key values that are created according to the same rule on the basis of random values provided by a device or seed values provided by a vehicle.

The processor 108 determines the STS indices in consideration of a 4-byte random value characteristic that is changed every ranging.

The processor 108 determines the encryption keys in consideration of a unique 16-byte key characteristic for each set of a vehicle and a device (smart key).

The processor 108 determines the nonces in consideration of a unique key characteristic (a fixed value different for each smart key) of an individual device (smart key).

The STS indices are defined as plaintext that has to be encrypted to generate an STS, STS encryption key, Data encryption key, STS Index encryption key are defined as encryption keys, and Salt, Source Address, and Random-Counter are defined as nonces.

The above-described three types of values are encryption key values that are created by a digital key (smartphone) on the basis of a random value pre-provided by a smartphone and a seed value provided by a vehicle according to the same rule.

The STS index is determined in consideration of a 4-byte random value characteristic that is changed every ranging.

The encryption key is determined in consideration of a unique 16-byte key (fixed value different for each vehicle) characteristic for each set of a vehicle and a smart key.

Basically, two trained smart keys are provided per vehicle (SMK), and up to four smart keys may be provided. The nonce is determined in consideration of a unique key (fixed value different for each smart key) characteristic of an individual smart key.

According to still another embodiment of the present invention, it is possible to allow sharing between a vehicle and a fob so that the smart key system can perform the most efficient derivation in consideration of the above characteristics.

In the case of the STS index, the device creates a 4-byte random value and forwards the random value through a pre-poll every ranging.

Since the pre-poll has no STS and only data, the STS of the poll, response, and final message is created using the STS index included in the data.

Since the encryption key is a different value for each vehicle, the encryption key includes PIN, VIN, or ISK (a secret key that is created using PIN and VIN and shared in the smart key training operation).

In relation to the nonce, numbers are given to a first anchor, a second anchor, a third anchor, and a fourth anchor according to the training order of the fob, and these numbers are used as nonces.

Meanwhile, the UWB operation method according to an embodiment of the present invention may be implemented in a computer system or recorded on a recording medium. The computer system may include at least one processor, memory, user input device, data communication bus, user output device, and storage. The above-described elements perform data communication through the data communication bus.

The computer system may further include a network interface coupled to a network. The processor may be a central processing unit (CPU) or a semiconductor device for processing instructions stored in a memory and/or a storage.

The memory and storage may include various types of volatile or non-volatile storage media. For example, the memory may include a read-only memory (ROM) and a random access memory (RAM).

Accordingly, the UWB operation method according to an embodiment of the present invention may be implemented in a computer-executable manner. When the UWB operation method according to an embodiment of the present invention is performed by a computer device, computer-readable instructions may implement the UWB operation method according to an embodiment of the present invention.

Meanwhile, the UWB operation method according to the present invention may be embodied as computer-readable code on a computer-readable recording medium. The computer-readable recording medium includes any type of recording medium in which data that can be decrypted by a computer system is stored. For example, the computer-readable recording medium may include a ROM, a RAM, a magnetic tape, a magnetic disk, a flash memory, an optical data storage device, and the like. Further, the computer-readable recording medium can be stored and carried out as codes that are distributed in a computer system connected to a computer network and that are readable in a distributed manner.

According to an embodiment of the present invention, by applying the UWB Ranging sequence defined by the international standard (CCC), it is possible to provide a communication scheme optimized by physical characteristics of UWB (e.g., communication interference due to NLOS-obstacle interference).

Advantageous effects of the present invention are not limited to the aforementioned effect, and other effects not described herein will be clearly understood by those skilled in the art from the above description.

The present invention has been described above with respect to embodiments thereof. Those skilled in the art should understand that various changes in form and details may be made herein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program (s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An ultra-wideband (UWB) system comprising:
    a memory in which a UWB ranging factor definition program is embedded; and
    a processor which executes the program,
    wherein the processor predefines UWB ranging factors to define an encryption key in consideration of a unique m-byte key characteristic for each set of a vehicle and a device.

2. The UWB system of claim 1, wherein the processor defines STS encryption key, Data encryption key, and STS Index encryption key as the encryption keys.

3. The UWB system of claim 1, wherein the processor further defines a scrambled timestamp sequence (STS) index and a nonce.

4. The UWB system of claim 3, wherein the processor defines Salt, Source Address, and RandomCounter as the nonces.

5. The UWB system of claim 3, wherein the processor defines the STS index, the encryption key, and the nonce in consideration of characteristic information by using encryption key values created according to the same rule on the basis of a random value provided by a device or a seed value provided by a vehicle.

6. The UWB system of claim 5, wherein the processor determines the STS index in consideration of a characteristic of an n-byte random value that is changed every ranging.

7. The UWB system of claim 6, wherein the n-byte random value is delivered through a pre-poll every ranging, and STS of a poll, a response, and a final message are created using the determined STS index.

8. The UWB system of claim 5, wherein the processor determines the nonce in consideration of a unique key characteristic of an individual device.

9. The UWB system of claim 8, wherein numbers assigned according to a training order of the individual devices are used as the nonces.

* * * * *